US00RE48604E

(19) United States
(12) Reissued Patent
Kim et al.

(10) Patent Number: US RE48,604 E
(45) Date of Reissued Patent: Jun. 22, 2021

(54) SCANNER MODULE AND IMAGE SCANNING APPARATUS EMPLOYING THE SAME

(71) Applicant: HEWLETT-PACKARD DEVELOPMENT COMPANY, L.P., Spring, TX (US)

(72) Inventors: Jung Kwon Kim, Seoul (KR); Dong Hun Lee, Seoul (KR); Hyun Surk Kim, Seongnam-si (KR); Kyung Rok Kim, Seongnam-si (KR)

(73) Assignee: HEWLETT-PACKARD DEVELOPMENT COMPANY, L.P., Spring, TX (US)

(21) Appl. No.: 15/782,348

(22) Filed: Oct. 12, 2017

Related U.S. Patent Documents

Reissue of:
(64) Patent No.: 9,179,029
Issued: Nov. 3, 2015
Appl. No.: 14/227,648
Filed: Mar. 27, 2014

U.S. Applications:
(63) Continuation of application No. 13/741,581, filed on Jan. 15, 2013, now Pat. No. 9,204,006, which is a
(Continued)

(30) Foreign Application Priority Data

Jul. 31, 2007 (KR) ..... 10-2007-0076640
Jul. 4, 2008 (KR) ..... 10-2008-0065047

(51) Int. Cl.
*H04N 1/04* (2006.01)
*H04N 1/024* (2006.01)
(Continued)

(52) U.S. Cl.
CPC ..... *H04N 1/0249* (2013.01); *G02B 6/0001* (2013.01); *G02B 6/0068* (2013.01);
(Continued)

(58) Field of Classification Search
CPC .. H04N 1/024; H04N 1/0249; H04N 1/02815; H04N 1/02835; H04N 1/02845;
(Continued)

(56) References Cited

U.S. PATENT DOCUMENTS 5,214,273 A * 5/1993 Yokochi ..... 250/208.1
5,446,640 A 8/1995 Lin
(Continued)

FOREIGN PATENT DOCUMENTS

CN 1761282 4/2006
EM 0 874 517 10/1998
(Continued)

OTHER PUBLICATIONS

European Search Report dated Sep. 9, 2009 in European Application No. 08153746.6.
(Continued)

*Primary Examiner* — Joshua D Campbell
(74) *Attorney, Agent, or Firm* — Staas & Halsey LLP

(57) ABSTRACT

A scanner module and an image scanning apparatus employing the same. The scanner module comprises an illuminator for illuminating light on an object to be scanned. The illuminator includes a light emitting diode, a light guide extending in a main scanning direction to change a direction of the light received from the light emitting diode, and at least one elastic member to elastically support at least one longitudinal end of the light guide. As the light guide is elastically supported by the elastic member, convex deformation or bowing of an emission face of the light guide due to thermal expansion can be reduced.

31 Claims, 20 Drawing Sheets

Related U.S. Application Data continuation of application No. 12/183,714, filed on Jul. 31, 2008, now Pat. No. 8,358,447, which is a continuation of application No. 12/118,856, filed on May 12, 2008, now Pat. No. 8,218,205.

(51) Int. Cl.
*H04N 1/028* (2006.01)
*F21V 8/00* (2006.01)

(52) U.S. Cl.
CPC ..... *G02B 6/0073* (2013.01); *G02B 6/0085* (2013.01); *H04N 1/024* (2013.01); *H04N 1/02815* (2013.01); *H04N 1/02835* (2013.01); *H04N 1/02845* (2013.01)

(58) Field of Classification Search
CPC .. G02B 6/0001; G02B 6/0068; G02B 6/0073; G02B 6/0085
USPC ..... 358/474, 475, 486, 496
See application file for complete search history.

(56) References Cited

U.S. PATENT DOCUMENTS 5,453,850 A 9/1995 Akuzawa et al.
5,737,096 A 4/1998 Takeuchi et al.
6,172,784 B1 1/2001 Konda
6,195,190 B1 * 2/2001 Tachibe ..... G02B 26/12 359/196.1
6,204,913 B1 * 3/2001 Miyawaki et al. ..... 355/67
6,232,592 B1 5/2001 Sugiyama
6,295,105 B1 9/2001 Lee et al.
6,326,602 B1 12/2001 Tabata
6,357,903 B1 3/2002 Furusawa et al.
6,388,774 B1 5/2002 Kurata et al.
6,411,353 B1 6/2002 Yarita et al.
6,479,812 B2 11/2002 Tabata
6,867,825 B2 3/2005 Kanatsu et al.
6,902,309 B2 6/2005 Uemura et al.
6,995,880 B2 2/2006 Tohyama et al.
7,042,599 B2 5/2006 Yokota et al.
7,076,148 B2 7/2006 Nemoto et al.
7,110,149 B2 9/2006 Cho
7,125,151 B2 10/2006 Uemura et al.
7,136,203 B2 11/2006 Yokota et al.
7,165,871 B2 * 1/2007 Takeda et al. ..... 362/538
7,316,353 B2 1/2008 Ikeda et al.
7,367,507 B2 5/2008 Chen et al.
7,502,148 B2 3/2009 Wang
7,548,352 B2 6/2009 Sakurai et al.
7,609,412 B2 10/2009 Maruyama
7,677,780 B2 3/2010 Lundin et al.
7,689,158 B2 3/2010 Sato et al.
7,724,317 B2 5/2010 Kim et al.
7,733,538 B2 6/2010 Kanesaka et al.
7,772,786 B2 8/2010 Hosoda et al.
7,778,572 B2 8/2010 Iijima
7,804,549 B2 * 9/2010 Ioki et al. ..... 349/5
7,855,815 B2 12/2010 Hayashide et al.
7,859,726 B2 12/2010 Endo et al.
7,884,978 B2 2/2011 Ikeno et al.
7,889,286 B2 2/2011 Yoo
7,903,298 B2 3/2011 Sawada et al.
7,920,304 B2 4/2011 Tatsuno et al.
7,924,478 B2 4/2011 Kim et al.
7,954,988 B2 * 6/2011 Lee et al. ..... 362/555
8,049,937 B2 11/2011 Saito
8,066,409 B2 11/2011 Toriyama et al.
8,218,205 B2 * 7/2012 Nagatani et al. ..... 358/475
8,228,567 B2 7/2012 Kim
8,281,205 B2 10/2012 Yokokawa
8,297,822 B2 10/2012 Lee et al.
8,323,430 B2 12/2012 Uber et al.
8,358,447 B2 * 1/2013 Kim et al. ..... 358/474
8,379,275 B2 2/2013 Tahk et al.
8,420,417 B2 4/2013 Jeong et al.
8,422,093 B2 4/2013 Ishida
8,488,216 B2 7/2013 Sakamoto et al.
8,537,434 B2 9/2013 Takahashi et al.
8,599,445 B2 * 12/2013 Kisara et al. ..... 358/474
8,717,636 B2 5/2014 Lee et al.
8,767,274 B2 7/2014 Tsumekawa et al.
8,767,774 B2 7/2014 Kurihara et al.
8,786,915 B2 * 7/2014 Kisara et al. ..... 358/474
8,867,825 B2 10/2014 Ostermann et al.
9,204,006 B2 12/2015 Kim et al.
2001/0035986 A1 11/2001 Ikeda
2003/0012036 A1 1/2003 Uemura et al.
2003/0076552 A1 4/2003 Lo et al.
2003/0112638 A1 6/2003 Honguh et al.
2003/0137751 A1 7/2003 Hayashide
2003/0147109 A1 8/2003 Chien
2003/0189827 A1 10/2003 Cheng
2004/0041984 A1 3/2004 Tani et al.
2005/0150956 A1 7/2005 Ikeda et al.
2006/0008290 A1 1/2006 Yamada et al.
2006/0092493 A1 * 5/2006 Yoshikawa ..... G02B 26/123 359/204.1
2006/0120098 A1 6/2006 Ikeda et al.
2006/0187500 A1 * 8/2006 Sakurai ..... H04N 1/02815 358/474
2006/0232659 A1 * 10/2006 Hayashi ..... B41J 2/473 347/243
2006/0261250 A1 * 11/2006 Narita ..... H01L 24/32 250/208.1
2007/0097342 A1 5/2007 Gomei et al.
2007/0109292 A1 * 5/2007 Dahan et al. ..... 345/211
2007/0159665 A1 * 7/2007 Kim ..... 358/474
2007/0177239 A1 8/2007 Tanijiri et al.
2008/0025750 A1 * 1/2008 Yamazaki ..... G02B 26/121 399/92
2008/0117728 A1 5/2008 Kim et al.
2009/0034285 A1 2/2009 Lee et al.
2009/0237747 A1 * 9/2009 Sawada et al. ..... 358/474
2009/0294630 A1 12/2009 Saito et al.
2010/0195166 A1 8/2010 Sawada et al.
2011/0235142 A1 * 9/2011 Kusuda et al. ..... 359/197.1
2011/0242619 A1 * 10/2011 Sugiyama ..... 358/475
2012/0154877 A1 6/2012 Kisara et al.
2013/0258421 A1 10/2013 Nakaie
2014/0092196 A1 * 4/2014 Masuda ..... 347/224
2014/0111835 A1 * 4/2014 Ozawa et al. ..... 358/475
2014/0293372 A1 * 10/2014 Okamoto et al. ..... 358/475
2014/0376065 A1 * 12/2014 Okamoto et al. ..... 358/475

FOREIGN PATENT DOCUMENTS

EP 0 874 517 10/1998
JP 2002-190917 7/2002
JP 2005-174796 6/2005
JP 2006-98500 4/2006
JP 2007234375 A 9/2007
JP 2008242217 A 10/2008
KR 10-2005-0073548 7/2005
KR 10-2007-0058183 6/2007
WO WO 2006/137263 A1 12/2006

OTHER PUBLICATIONS

European Office Action dated Mar. 10, 2011 in European Application No. 08153746.6.
Chinese Office Action dated Aug. 30, 2011 in Chinese Application No. 200810135335.9.
European Search Report dated Oct. 20, 2011 in European Application No. 11180781.4.
U.S. Office Action dated Apr. 1, 2011 in corresponding U.S. Appl. No. 12/118,856.
U.S. Office Action dated Oct. 28, 2011 in corresponding U.S. Appl. No. 12/118,856.
U.S. Notice of Allowance dated Mar. 9, 2012 in corresponding U.S. Appl. No. 12/118,856.

(56) References Cited

OTHER PUBLICATIONS

U.S. Office Action dated Jul. 22, 2011 in corresponding U.S. Appl. No. 12/183,714.
U.S. Office Action dated Dec. 14, 2011 in corresponding U.S. Appl. No. 12/183,714.
U.S. Office Action dated Jun. 4, 2012 in corresponding U.S. Appl. No. 12/183,714.
U.S. Notice of Allowance dated Sep. 19, 2012 in corresponding U.S. Appl. No. 12/183,714.
U.S. Office Action dated May 30, 2013 in copending U.S. Appl. No. 13/741,581.
U.S. Notice of Allowance dated Sep. 5, 2013 in copending U.S. Appl. No. 13/741,581.
U.S. Notice of Allowance dated Dec. 17, 2013 in copending U.S. Appl. No. 13/741,581.
U.S. Notice of Allowance dated May 14, 2014 in copending U.S. Appl. No. 13/741,581.
U.S. Notice of Allowance dated May 5, 2014 in copending U.S. Appl. No. 13/754,119.
U.S. Office Action dated Jun. 13, 2013 in copending U.S. Appl. No. 13/754,119.
U.S. Notice of Allowance dated Oct. 15, 2013 in copending U.S. Appl. No. 13/754,119.
U.S. Office Action dated Jul. 25, 2011 in corresponding U.S. Appl. No. 12/183,664.
U.S. Office Action dated Dec. 16, 2011 in corresponding U.S. Appl. No. 12/183,664.
U.S. Office Action dated Jun. 5, 2012 in corresponding U.S. Appl. No. 12/183,664.
U.S. Notice of Allowance dated Oct. 12, 2012 in corresponding U.S. Appl. No. 12/183,664.
U.S. Office Action dated Aug. 7, 2014 in copending U.S. Appl. No. 14/161,242.
Korean Office Action dated May 30, 2014 in corresponding Korean Application No. 10-2008-0065047.
Korean Office Action dated May 31, 2014 in corresponding Korean Application No. 10-2008-006504.
Korean Notice of Allowance dated Dec. 15, 2014 in corresponding Korean Patent Application No. 10-2008-0065047.
US Notice of Allowance dated Nov. 25, 2014 in copending U.S. Appl. No. 13/490,709.
US Notice of Allowance dated Oct. 29, 2014 in copending U.S. Appl. No. 13/754,119.
US Notice of Allowance dated Dec. 9, 2014 in copending U.S. Appl. No. 14/161,242.
US Notice of Allowance dated Oct. 29, 2014 in copending U.S. Appl. No. 13/741,581.
U.S. Notice of Allowance dated Mar. 30, 2015 in corresponding U.S. Appl. No. 14/161,242.
U.S. Notice of Allowance dated Mar. 12, 2015 in corresponding U.S. Appl. No. 13/754,119.
U.S. Notice of Allowance dated Mar. 6, 2015 in corresponding U.S. Appl. No. 13/741,581.
U.S. Notice of Allowance dated Jun. 29, 2015 in corresponding U.S. Appl. No. 14/227,648.
Chinese Office Action dated Mar. 11, 2015 in corresponding Chinese Patent Application No. 201210135348.2.
U.S. Office Action dated Jun. 9, 2015 in corresponding U.S. Appl. No. 13/490,709.
U.S. Office Action dated Jun. 26, 2015 in corresponding U.S. Appl. No. 14/496,607.
U.S. Notice of Allowance dated Jul. 24, 2015 in corresponding U.S. Appl. No. 13/754,119.
U.S. Notice of Allowance dated Jul. 17, 2015 in corresponding U.S. Appl. No. 13/741,581.
U.S. Office Action dated Mar. 2, 2015 in corresponding U.S. Appl. No. 14/227,648.
U.S. Office Action dated Oct. 10, 2014 in corresponding U.S. Appl. No. 14/227,648.
U.S. Appl. No. 14/672,823, now issued as U.S. Pat. No. 9,531,902, filed Mar. 30, 2015 Jung Kwon Kim, Samsung Electronics Co., Ltd.
U.S. Appl. No. 13/490,709, now issued as U.S. Pat. No. 9,277,081, filed Jun. 7, 2012, Kaname Nagatani, Samsung Electronics Co., Ltd.
U.S. Appl. No. 14/496,607, now abandoned, filed Sep. 25, 2014, Kaname Nagatani, Samsung Electronics Co., Ltd.
U.S. Appl. No. 13/754,119, now issued as U.S. Pat. No. 9,210,287, filed Jan. 10, 2013, Gyung Mo Tahk, Samsung Electronics Co., Ltd.
U.S. Appl. No. 14/161,242, now issued as U.S. Pat. No. 9,137,412, filed Jan. 22, 2014, Gyung Mo Tahk, Samsung Electronics Co., Ltd.
European Search Report issued Sep. 9, 2009 in European Application No. 08153746.6.
European Office Action issued Mar. 10, 2011 in European Application No. 08153746.6.
Chinese Office Action issued Aug. 30, 2011 in Chinese Application No. 200810135335.9.
European Search Report issued Oct. 20, 2011 in European Application No. 11180781.4.
U.S. Office Action issued Apr. 1, 2011 in corresponding U.S. Appl. No. 12/118,856.
U.S. Office Action issued Oct. 28, 2011 in corresponding U.S. Appl. No. 12/118,856.
U.S. Notice of Allowance issued Mar. 9, 2012 in corresponding U.S. Appl. No. 12/118,856.
U.S. Office Action issued Jul. 22, 2011 in corresponding U.S. Appl. No. 12/183,714.
U.S. Office Action issued Dec. 14, 2011 in corresponding U.S. Appl. No. 12/183,714.
U.S. Office Action issued Jun. 4, 2012 in corresponding U.S. Appl. No. 12/183,714.
U.S. Notice of Allowance issued Sep. 19, 2012 in corresponding U.S. Appl. No. 12/183,714.
U.S. Office Action issued May 30, 2013 in copending U.S. Appl. No. 13/741,581.
U.S. Notice of Allowance issued Sep. 5, 2013 in copending U.S. Appl. No. 13/741,581.
U.S. Notice of Allowance issued Dec. 17, 2013 in copending U.S. Appl. No. 13/741,581.
U.S. Appl. No. 13/741,581, filed Jan. 15, 2013, Jung Kwon Kim, Samsung Electronics Co., Ltd.
U.S. Notice of Allowance issued May 14, 2014 in copending U.S. Appl. No. 13/741,581.
U.S. Notice of Allowance issued May 5, 2014 in copending U.S. Appl. No. 13/754,119.
U.S. Office Action issued Jun. 13, 2013 in copending U.S. Appl. No. 13/754,119.
U.S. Appl. No. 13/754,119, filed Jan. 10, 2013, Gyung Mo Tank, Samsung Electronics Co., Ltd.
U.S. Appl. No. 14/161,242, filed Jan. 22, 2014, Gyung Mo Tahk, Samsung Electronics Co., Ltd.
US Notice of Allowance dated Jun. 19, 2014 in U.S. Appl. No. 13/490,709.
US Office Action dated Mar. 3, 2014 in U.S. Appl. No. 13/490,709.
US Office Action dated Jul. 17, 2013 in U.S. Appl. No. 13/490,709.
US Office Action dated Nov. 28, 2012 in U.S. Appl. No. 13/490,709.
U.S. Appl. No. 13/490,709, filed Jun. 7, 2012, Kaname Nagatani, Samsung Electronics Co., Ltd.
U.S. Appl. No. 14/496,607, filed Sep. 25, 2014, Kaname Nagatani, Samsung Electronics Co., Ltd.
US Notice of Allowance issued Nov. 25, 2014 in copending U.S. Appl. No. 13/490,709.
US Notice of Allowance issued Oct. 29, 2014 in copending U.S. Appl. No. 13/754,119.
US Notice of Allowance issued Dec. 9, 2014 in copending U.S. Appl. No. 14/161,242.
US Notice of Allowance issued Oct. 29, 2014 in copending U.S. Appl. No. 13/741,581.
U.S. Notice of Allowance issued Mar. 30, 2015 in corresponding U.S. Appl. No. 14/161,242.
U.S. Notice of Allowance issued Mar. 12, 2015 in corresponding U.S. Appl. No. 13/754,119.
U.S. Notice of Allowance issued Mar. 6, 2015 in corresponding U.S. Appl. No. 13/741,581.

(56) References Cited

OTHER PUBLICATIONS

Chinese Office Action issued Mar. 11, 2015 in corresponding Chinese Patent Application No. 201210135348.2.
U.S. Appl. No. 14/672,823, filed Mar. 30, 2015, Jung Kwon Kim, Samsung Electronics Co., Ltd.
Korean Notice of Allowance issued Dec. 15, 2014 in corresponding Korean Patent Application No. 10-2008-0065047.
U.S. Notice of Allowance issued Jul. 24, 2015 in corresponding U.S. Appl. No. 13/754,119.
U.S. Office Action issued Jun. 9, 2015 in corresponding U.S. Appl. No. 13/490,709.
U.S. Office Action issued Jun. 26, 2015 in corresponding U.S. Appl. No. 14/496,607.
U.S. Notice of Allowance issued Jul. 17, 2015 in corresponding U.S. Appl. No. 13/741,581.

* cited by examiner

SCANNER MODULE AND IMAGE SCANNING APPARATUS EMPLOYING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of U.S. patent application Ser. No. 13/741,581 filed Jan. 15, 2013, which is pending, which is a continuation of U.S. patent application Ser. No. 12/183,714, filed Jul. 31, 2008, which issued Jan. 22, 2013 as U.S. Pat. No. 8,358,447, and claims the benefit of Korean Patent Application No. 2007-0076640, filed on Jul. 31, 2007, and Korean Patent Application No. 10-2008-0065047 filed on Jul. 4, 2008, which is a continuation of U.S. patent application Ser. No. 12/118,856 filed on May 12, 2008, which issued Jul. 10, 2012 as U.S. Pat. No. 8,218,205 and which claims the disclosure of the benefit of Korean Patent Application No. 2007-0076640, each of which is incorporated herein by reference in its entirety.] *This application is a reissue application of U.S. patent application Ser. No. 14/227,648, filed on Mar. 27, 2014, issued as U.S. Pat. No. 9,179,029 on Nov. 3, 2015, which is a continuation of application Ser. No. 13/741,581, filed on Jan. 15, 2013, which issued as U.S. Pat. No. 9,204,006 on Dec. 1, 2015, which is a continuation of application Ser. No. 12/183,714, filed on Jul. 31, 2008, which issued as U.S. Pat. No. 8,358,447 on Jan. 22, 2013, which is a continuation of application Ser. No. 12/118,856, filed on May 12, 2008, which issued as U.S. Pat. No. 8,218,205 on Jul. 10, 2012, and which claims the benefit of Korean Application No. 10-2007-0076640, filed on Jul. 31, 2007 and Korean Application No. 10-2008-0065047, filed on Jul. 4, 2008, in the Korean Intellectual Property Office, the disclosures of which are incorporated herein by reference.*

BACKGROUND

1. Field

The present invention relates to a scanner module and an image scanning apparatus employing the scanner module, and, more particularly, to a mounting structure of a light guide in a scanner module.

2. Description of the Related Art

Generally, a scanner module may be employed in an image reading apparatus to read image from a desired portion of a document. To this end, a scanner module may include an illuminator to irradiate light to the portion of the document to be read and a focusing lens to focus the light reflected from the portion of the document on an image sensor.

With recent development of inexpensive high-luminous-intensity white light-emitting diodes, a scanner module employing white light emitting diodes as the light source has been developed.

An illuminator however also needs to have an appropriate light distribution to provide a uniform image output for each pixel. For this reason, a light guide has been used to guide light, irradiated from light emitting diodes, to the desired illuminating position.

An example of an illuminator that employs light emitting diodes and a light guide, is disclosed in U.S. Pat. No. 6,357,903 B1 to Furusawa et al. ("Furusawa"), which was issued on Mar. 19, 2002).

In legacy illuminators, e.g., one described by Furusawa, a light source is provided at one end of an elongated transparent light guide that is mounted in a case by being slid lengthwise into the case. During the lengthwise insertion onto the case, damages to the light guide suffer, e.g., scratches, or the like, which may have adverse effect on the scanning performance. In addition, there is no structure to guide the light guide into the proper mounting position, exacerbating the possibility of damages, and resulting in imprecise assembly.

When light emitting diodes are used as the light source of an illuminator, the luminous intensity may be limited to a predetermined level. While a higher current or voltage is supplied to the light emitting diodes may result in the light emitting diodes producing light with enhanced luminous intensity, the increased power also raises the temperature of the light emitting diodes, and, consequently, may deteriorate the luminous intensity of light actually emitted by the light emitting diodes.

Moreover, it is desirable that an illuminator be easy to assemble so as to allow mass production. A conventional light guide is formed as an elongated transparent member, which is prone to bending or bowing. It is thus also desirable to provide a guide holder that is capable of supporting the light guide while maintaining the light guide straight.

Furthermore, in the above-described conventional illuminator, both ends of the light guide are fixedly supported, causing the light guide to bend or bow along its length when the light guide lengthens due to thermal expansion by heat generated from the light source. These deformation or damages, e.g., bending or scratches, or the like, of the light guide causes variation in characteristics of light emitted therethrough, and adversely affects the scanning performance and/or quality.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

Therefore, one or more embodiments relate to an illuminator for use in an image scanning apparatus to illuminate light on an object to be scanned.

In accordance with one or more embodiments, an illuminator for use in an image scanning apparatus to illuminate light on an object to be scanned may include a light source configured to produce the light, a light guide having an elongated shape with its length extending along a first direction, the light guide being configured to receive the light from the light source, and to change a direction of the received light, a light source holder to mount the light source to the light guide, and at least one elastic member elastically supporting at least one of longitudinal ends of the light guide.

A light guide according to one or more embodiments may include an incidence face formed on at least one longitudinal end of the light guide, the light guide receiving the light from the light source through the incident face, and the elastic member elastically supports the light source, so as to cause the light source to be in close proximity to the incidence face of the light guide.

The elastic member may support the light source and may be disposed so as to elastically bias the light source toward the incidence face of the light guide.

The elastic member may be made of a thermally conductive material.

The elastic member may include a metallic leaf spring.

The elastic member may be made of a resin material, and a radiating member made of a thermally conductive material may be provided between the elastic member and the light source holder.

The illuminator may be integrally formed with a body of a scanning module, and the radiating member may extend outward from between the elastic member and the light source holder, and may be fixed to the body of the scanner module.

An illuminator according to one or more embodiments may include a thermal coupling provided between a light source holder and a radiating member.

The light source holder may have a hole through which the light source is exposed.

An illuminator according to one or more embodiments may further include a guide holder having formed thereon a mounting recess into which the light guide may be received, the guide holder may further include a light source mounting portion in which the light source holder is mounted, and the elastic member may be provided between a wall surface of the light source mounting portion and the light source.

The elastic member may include an elastic portion convexly raised to exhibit an elastic force, and supporting portions formed at both sides of the elastic portion to allow the elastic member to be supported at both ends of the light source mounting portion.

An illuminator according to one or more embodiments may further include a guide holder having formed thereon a mounting recess into which the light guide may be received, the mounting recess possibly including an entrance portion, through which the light guide enters the mounting recess, and at least one supporting protrusion formed at the entrance portion of the mounting recess to protrude into the mounting recess to, when the light guide is received in the mounting recess, be in an interfering contact with the light guide to restrict movement of the light guide in at least a second direction perpendicular to the first direction.

The light guide may be received into the mounting recess in a second direction substantially perpendicular to the first direction.

The elastic member may comprise a pair of elastic members, each of which pair supporting a corresponding respective one of the longitudinal ends of the light guide.

In accordance with one or more embodiments, a scanning module for use in an image scanning apparatus for scanning an object may include an illuminator configured to illuminate a light on the object to be scanned; and a sensor configured to detect the light reflected from the object. The illuminator may include a light source configured to produce the light, a light guide having an elongated shape with its length extending along a first direction, the light guide being configured to receive the light from the light source, and to change a direction of the received light, a light source holder to mount the light source to the light guide; and at least one elastic member elastically supporting at least one of longitudinal ends of the light guide.

The light source may face the incidence face of the light guide and the elastic member may support the substrate opposite a side of the substrate on which the light source is disposed so as to elastically bias the light source toward the incidence face of the light guide.

The elastic member may be made of a thermally conductive material.

The elastic member may be made of a resin material, and a radiating member made of a thermally conductive material is provided between the elastic member and the light source holder.

The scanning module may further include a thermal coupling provided between the light source holder and the radiating member.

The scanning module may further include a guide holder having formed thereon a mounting recess into which the light guide may be received. The guide holder may further include a light source mounting portion in which the light source holder may be mounted, and the elastic member may be provided between a wall surface of the light source mounting portion and the light source holder.

The elastic member may include a pair of elastic members, each of which pair may support a corresponding respective one of the longitudinal ends of the light guide.

In accordance with one or more embodiments, an image scanning apparatus may include a scanner module, a controller configured to control an operation of the scanner module. The scanner module may include an illuminator configured to illuminate a light on an object to be scanned, and a sensor configured to detect the light reflected from the object. The illuminator may include a light source configured to produce the light, a light guide having an elongated shape with its length extending along a first direction, the light guide being configured to receive the light from the light source, and to change a direction of the received light, a light source holder to mount the light source to the light guide, and at least one elastic member elastically supporting at least one of longitudinal ends of the light guide.

The light source may be facing the incidence face of the light guide and the elastic member supporting the light source may be disposed so as to elastically bias the light source toward the incidence face of the light guide.

The elastic member may be made of a thermally conductive material.

The elastic member may be made of a resin material, and a radiating member made of a thermally conductive material may be provided between the elastic member and the light source holder.

In accordance with one or more embodiments, an image scanning apparatus may further include a thermal coupling provided between the light source holder and the radiating member.

In accordance with one or more embodiments, an image scanning apparatus may further include a guide holder having formed thereon a mounting recess into which the light guide is received. The guide holder may further include a light source mounting portion in which the light source holder may be mounted, and the elastic member may be provided between a wall surface of the light source mounting portion and the light source holder.

The elastic member may include a pair of elastic members, each of which pair may support a corresponding respective one of the longitudinal ends of the light guide.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects and advantages of the embodiments of the invention will become apparent and be more readily appreciated from the following description of the embodiments, taken in conjunction with the accompanying drawings, of which.

DETAILED DESCRIPTION

Figure 1:
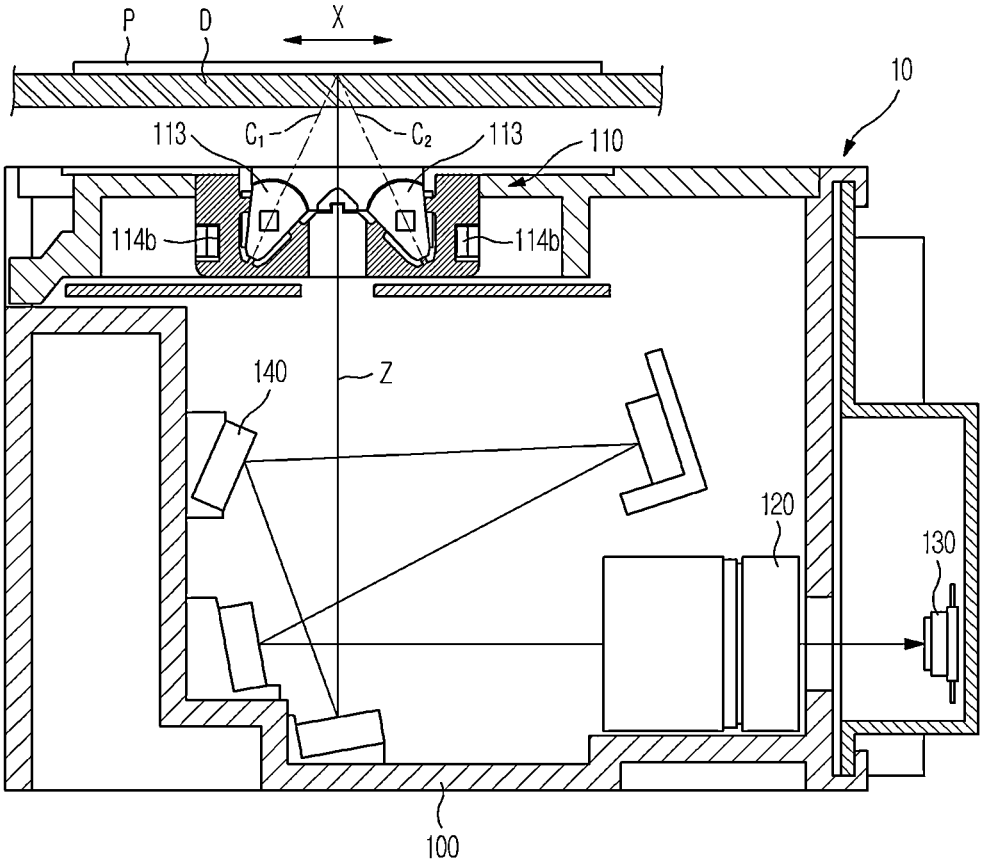
FIG. 1 is a sectional view illustrating optical arrangement of a scanner module in accordance with an embodiment of the present invention.

Reference will now be made in detail to embodiments of the present invention, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail.

FIG. 1 is a sectional view illustrating optical arrangement of a scanner module 10 according to an embodiment of the present invention. Referring to FIG. 1, the scanner module 10 may be devised to scan an image across a sub scanning direction X. The scanner module 10 includes an illuminator 110, which irradiates a light to a document platform D, a focusing lens 120, which focuses the light reflected from a scan object P, such as a document, or the like, disposed on the document platform D, and a sensor unit 130, which receives the light focused by the focusing lens 120 and senses an image based on the received light. The scanner module 10 further includes a scanner module body 100 having an inner space in which the focusing lens 120 and the sensor unit 130 may be housed. A seating recess 100a (See FIG. 2) may provided on the top portion of the scanner module body 100 for accommodating the illuminator 110.

Figure 2:
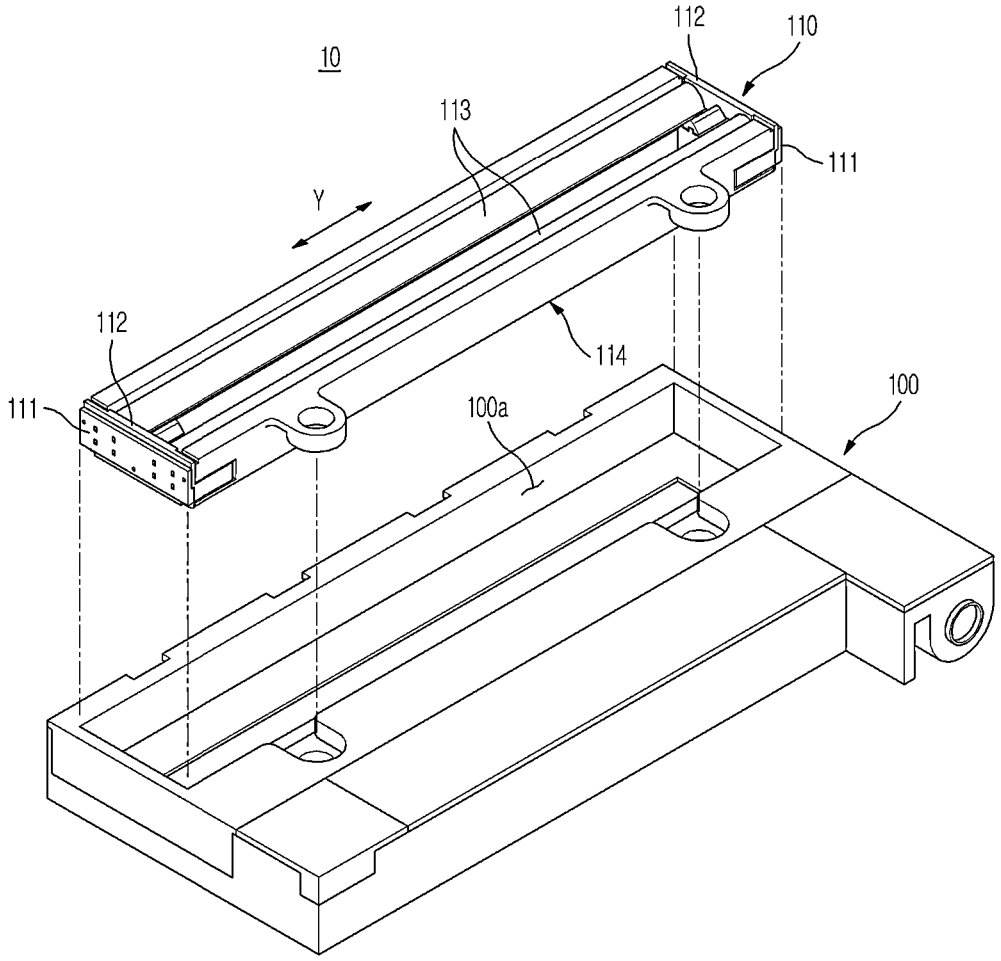
FIG. 2 is a perspective view of the scanner module in accordance with an embodiment of the present invention.
Figure 3:
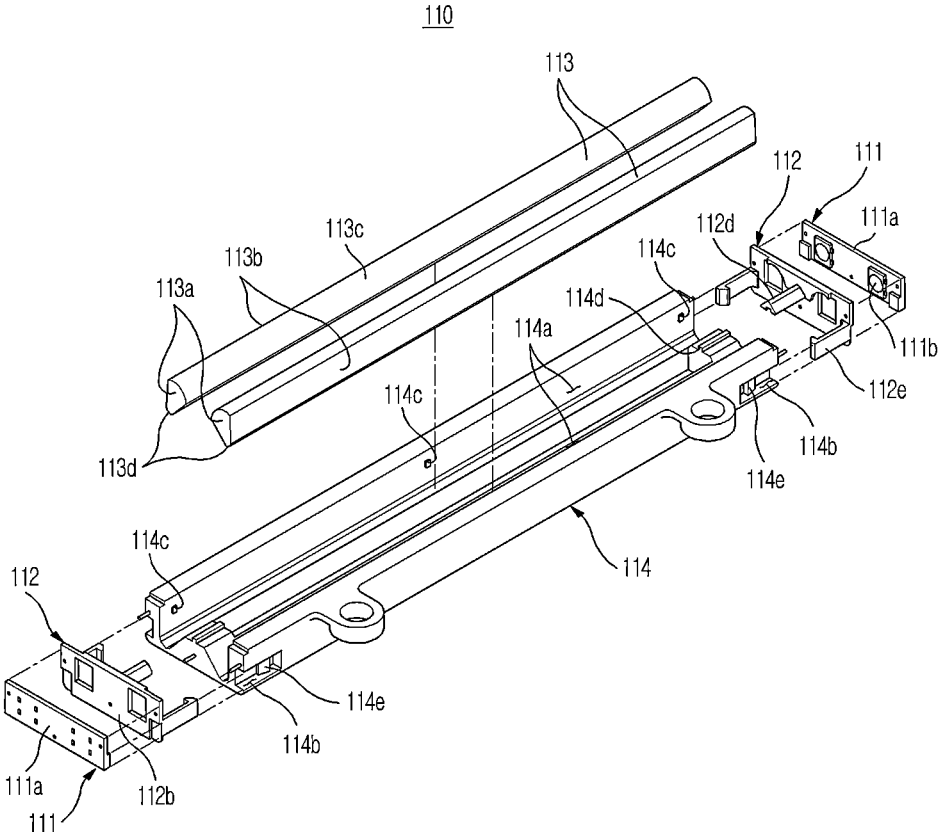
FIG. 3 is an exploded perspective view illustrating an illuminator in accordance with a first embodiment of the present invention.
Figure 4:
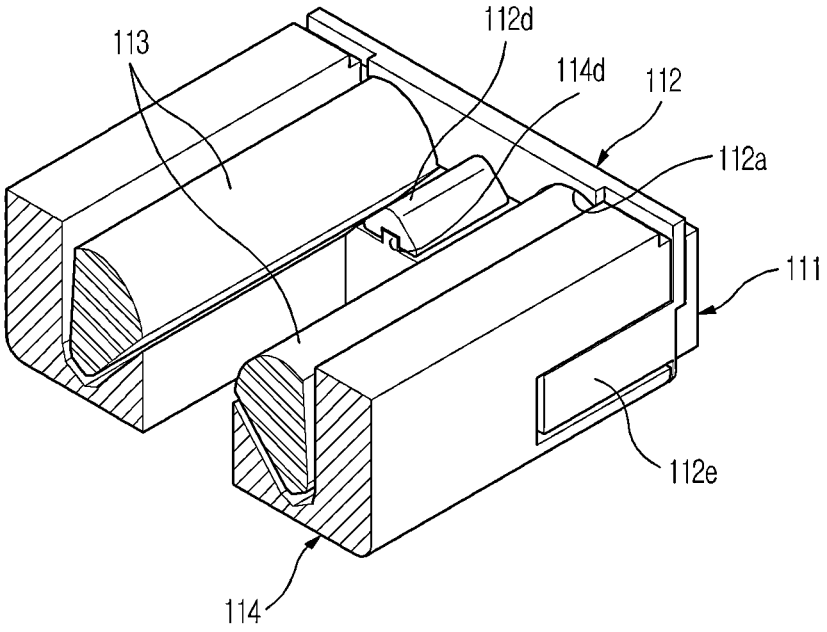
FIG. 4 is a perspective and partial sectional view of portions of the illuminator of FIG. 3.

The illuminator 110 serves to irradiate light to the scan object P. As shown in FIGS. 2 and 3, the illuminator 110 may include light source of sources 111 that produce the light, and light source holders 112 to which the light sources 111 are mounted. The illuminator 110 may further include light guides 113, the lengths of which extend along a main scanning direction Y (orthogonal to the sub scanning direction X), and which are arranged to face and oppose the document platform D. The illuminator 110 may further include a guide holder 114 having light guide mounting portions 114a for mounting of the light guides 113 and light source mounting portions 114b for mounting of the light source holders 112.

Referring again to FIG. 1, the focusing lens 120 is located between the document platform D and the sensor unit 130, and serves to focus the light reflected from the scan object P onto the sensor unit 130.

The sensor unit 130 receives the light focused thereon by the focusing lens 120, and serves to detect an image of the scan object P based on the received light. Depending on the particular scanning application, the sensor unit 130 may have a single-row configuration, or a multiple row configuration, for scanning of Red/Green/Blue color images or Red/Green/Blue/Black-and-White images. Specifically, the sensor unit 130 may include image sensors, e.g., charge coupled device (CCD) or complimentary metal oxide (CMOS) pixel elements, for respective colors, which are arranged in plural rows spaced apart from one another.

A plurality of reflecting mirrors 140 may further be provided between the scan object P and the focusing lens 120. The reflecting mirrors 140 serve to define a light path within the inner space of the scanner module body 100. To this end, the reflecting mirrors 140 reflect the light reflected from the scan object P, and change the light path to direct the light toward the focusing lens 120. Providing the plurality of reflecting mirrors 140 may advantageously achieve the required light focusing distance between the scan object P and the sensor unit 130, and may also result in a compact size of the scanner module body 100. In the present embodiment, the scanner module 10 is provided with four reflecting mirrors 140, but the present invention is not so limited, and any number of reflecting mirrors can be selected for a particular design.

Figure 8:
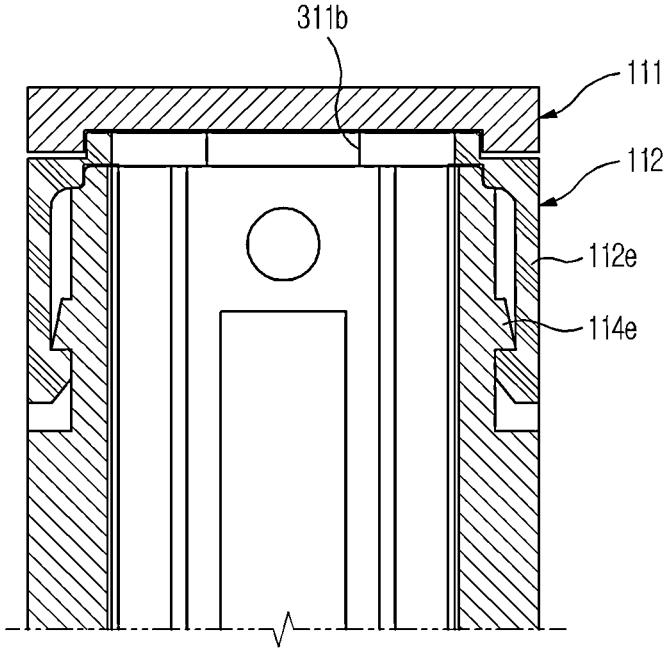
FIG. 8 is a partial sectional view illustrating coupling of a guide holder and light source holder shown in FIGS. 2-7

FIGS. 2 to 5 are a perspective view, an exploded perspective view, a partial perspective view, and a sectional view, respectively, illustrating the illuminator employed according to the first embodiment of the present invention. FIG. 6 is a perspective view illustrating the light source holder according to an embodiment. FIG. 8 is a partial sectional view illustrating assembly of the guide holder and the light source holder shown in FIGS. 2-6.

Referring to the drawings, the illuminator 110 is employed in the scanner module 10, to irradiate light to the scan object P, which is disposed on the document platform D, in the main scanning direction Y that is substantially orthogonal to the sub scanning direction X of the scanner module 10.

The illuminator 110 includes light sources 111 producing light, the light source holders 112 to which the light sources 111 are mounted, the light guides 113 longitudinally arranged along the main scanning direction Y to face the document platform D, and the guide holder 114, in which the light guides 113 are mounted.

Each of the light sources 111 may include a substrate 111a mounted to the light source holder 112, and light emitting diodes 111b formed on the substrate 111a to irradiate light upon receiving power through the substrate 111a. In an embodiment, the light emitting diodes 111b may be white light emitting diodes.

The light guides 113 change a direction of the light irradiated from the light sources 111, so as to direct the light to an image reading region on the document platform D. In one embodiment, to enhance the luminous intensity of light to be directed to the image reading region, the plurality of light guides 113 may be provided.

The light guides 113 are made of a transparent material such as glass, plastic, or the like, and have an elongated shape, the length of which extending along the main scanning direction Y. Each of the light guides 113 includes at least one incidence face 113a, guide faces 113b and an emission face 113c.

The incidence face 113a receives the light from the corresponding light emitting diode 111b. The incidence face 113a is formed on at least one of both longitudinal ends of the respective light guides 113. Here, the light source 111 is mounted to the light source holder 112 such that the light source 111 faces the incidence face 113a of the light guide 113.

The emission face 113c opposes the document platform D, through which the light diffused and reflected by the guide faces 113b is emitted. In one embodiment, the emission face 113c may form a collimating lens.

The guide faces 113b are formed at both longitudinal sides of the light guide 113. If light is introduced through the incidence face 113a via total internal reflection, the guide faces 113b guide the direction of the light, allowing the light to be emitted throughout the emission face 113c.

The reflecting face 113d reflects the light, introduced thereto through the incidence face 113a, toward the emission face 113c. The reflecting face 113d is formed at the light guide 113 at an opposite side of the emission face 113c. For reflection of light, the reflecting face 113d has a light reflecting pattern defined by convex and concave portions.

In the present embodiment, a pair of the light guides 113 is arranged to be adjacent to each other along the sub scanning direction X. The pair of light guides 113 may be tilted towards each other to direct the light to the image reading region without interfering with the light reflected from the scan object P. That is, as shown in FIG. 1, center axes C1 and C2 of light having passed through the two respective light guides 113 are tilted with respect to the center optical axis Z.

In the embodiment shown, a pair of the light sources 111 is provided for each of the light guides 113, a pair of the light emitting diodes 111b being installed on the substrate 111a of each light source 111. With this configuration, the two light emitting diodes 111b of each of the pair of light sources 111 can irradiate the light on each incidence face 113a formed at both ends of each of the pair of light guides 113.

In addition, a light source holders 112 is provided on each longitudinal ends of the guide holder 114 such that a light source 111 is provided on each of the ends of each light guide 113. When light is irradiated from the light source 111 provided at one end of a light guide 113, and is introduced to the light guides 113 through the incidence faces 113a facing the light source 111, in order to prevent the light from leaking from the light guides 113 through the incidence faces 113a at the other end, the pair of light source holders 112 are arranged to cover both incidence faces 113a of the respective light guides 113, the light source holders 112 being adapted to reflect the light. That is, the pair of light source holders 112 covers the pair of incidence faces 113a of each light guide 113, thereby preventing the light, introduced into the light guide 113 through the incidence faces 113a of on one end, from leaking from the light guide 113 through the incidence face 113a on the other end of the light guide 113.

In an embodiment, preferably, the light source holders 112 are made of a white material to reflect and diffuse light, the material having a light reflectivity of 70% or greater. With adoption of the light source holders 112 to prevent the light, irradiated from the light sources 111 into the light guides 113, from leaking from the light guides 113 through the incidence faces 113a, the illuminator 110 can achieve greater luminous intensity of light using the same light sources 111.

While the above embodiment is described to include a pair of light sources 111 at each end of the light guides 113 via the pair of light source holders 112, but this configuration is given only as an example. Alternatively, a single light source 111 may be mounted to only one end of each of the light guides 113 via a single light source holder 112.

According to an embodiment, the guide holder 114 may serve to guide mounting positions of the light guides 113 and the light sources 111. To this end, the guide holder 114 is formed with at least one light source mounting portion 114b to which the light source holder 112 may be mounted to provide a light source 111 on at least one end of each of the light guides 113, and the light guide mounting portions 114a in which the light guides 113 are to be mounted.

Each light guide mounting portion 114a may be recessed into the guide holder 114 extending longitudinally along the main scanning direction Y, and has a shape corresponding to that of the light guide 113. For example, in the embodiment shown, the light guide mounting portion 114a may have a trapezoidal cross-sectional shape having an inwardly tapered cross section. In the embodiment, the pair of the light guide mounting portions 114a are arranged adjacent each other along the sub scanning direction X, and extend parallel to each other along the main scanning direction Y such that the pair of light guides 113 can be mounted parallel to each other.

Preferably, the light guide 113 is inserted into the light guide mounting portion 114a by being moved in a direction orthogonal to the longitudinal direction of the light guide 113. If the light guide 113 is inserted into the longitudinal direction of the light guide mounting portion 114a, scratches may occur on an outer surface of the light guide 113. Inserting the light guide 113 in a direction orthogonal to the longitudinal direction thereof may reduce the possibility of scratching the light guides 113. For example, in the embodiment shown, the light guide mounting portion 114a has, e.g., a trapezoidal cross section with its height significantly smaller than its length. Therefore, when a light guide 113 is inserted into the light guide mounting portion 114a along the height of the light guide mounting portion 114a, i.e. orthogonal to the longitudinal direction of the light guide 113, the contact distance between the light guide 113 and the light guide mounting portion 114a may be substantially shorter that when the light guide 113 is received into the recess in lengthwise direction, and consequently, damage to the light guide 113 can be minimized.

The guide holder 114 may be made of a flexible material, which is elastically deformable in response to a pressing force. For example, before the light guide 113 is inserted into the light guide mounting portion 114a, the light guide mounting portion 114a, as represented by the dotted line in FIG. 5, may have a narrower initial inner space than the space required for mounting of the light guide 113.

Figure 5:
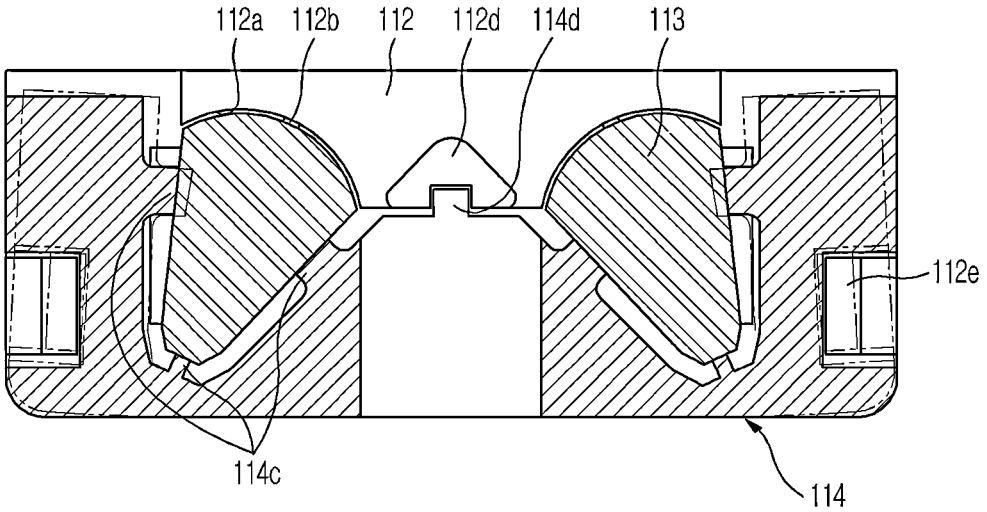
FIG. 5 is a sectional view of the illuminator of FIG. 3.
Figure 6:
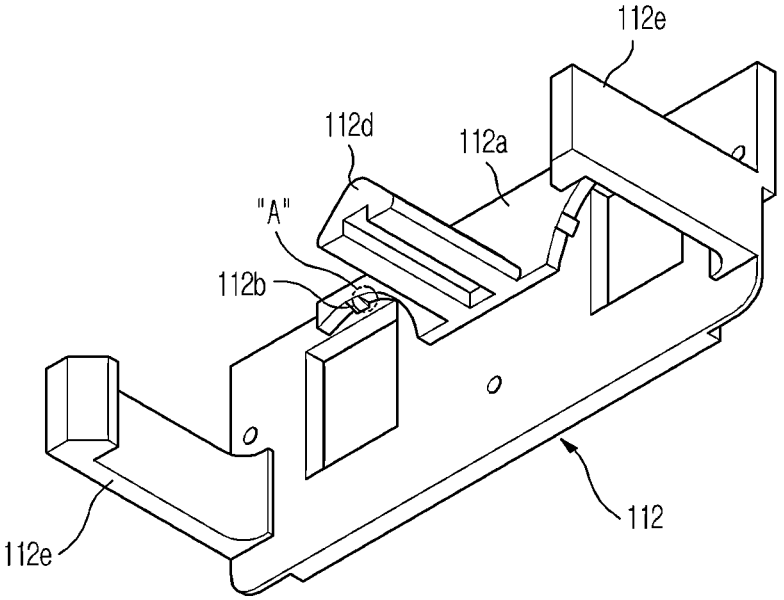
FIG. 6 is a perspective view illustrating an embodiment of a light source holder of the illuminator of FIG. 3.

When the light guide 113 is received into the light guide mounting portion 114a, as shown in FIG. 5, the light guide mounting portion 114a expands by the insertion of the light guide 113, preventing unwanted movement of the light guide 113 after installation.

According to an embodiment, the illuminator 110 may further include spacers 114c provided on the inner surface of the light guide mounting portion 114a to support the light guide 113.

Once the light guide 1133 is inserted into the light guide mounting portion 114a that includes the spacers 114c, the light guide 113 can be supported by the spacers 114c while allowing gaps between the light guide 113 and the inner surface of the light guide mounting portion 114a. Providing the spacers 114c may further alleviate the problem of incompletely supporting the light guide 113 due to spatial deformation of the light guide mounting portion 114a resulting during manufacture of the guide holder 114. This consequently reduce bending of the light guide 113, and helps to maintain straightness of the light guide 113.

A plurality of spacers 114c may be spaced apart from one another along the longitudinal direction of the light guide 113. For example, in the present embodiment, the spacers 114c may be provided at the center and at opposite ends of the light guide mounting portion 114a along its length. As shown in FIG. 5, the spacers 114c may be arranged on the side wall surfaces and bottom surface of the light guide mounting portion 114a, so as to support the light guide 113 in three directions.

When a pair of the spacers 114c are arranged on the side wall surfaces of the light guide mounting portion 114a, the distance between the spacers 114c on opposite wall surfaces may be made smaller than the width of the light guide 113 to be located between the spacers 114c. With this configuration, as the light guide 113 is inserted into the light guide mounting portion 114a, the guide holder 114 is elastically deformed to provide a required installation space for the light guide 113, and the light guide 113 can come into pressing contact with the respective spacers 114c. In one embodiment, the spacers 114c may be formed integrally with the guide holder 114, which may improve assembly efficiency, and may reduce manufacturing costs.

The light source holder 112 may include a fixing portion 112a to keep the light guide 113 in place. The fixing portion 112a protrudes to have an inner contour corresponding to the contour of the emission face 113c of the light guide 113, and can be made to come into direct or indirect contact with the emission face 113c of the light guide 113 so as to prevent vertical movement of the light guide 113.

For example, as shown in FIG. 6, the light source holder 112 may further include a fixing rib 112b formed on the inner edge surface of the fixing portion 112a. Once the light guide 113 is mounted in the light guide mounting portion 114a, the fixing rib 112b may come into partial contact with the light guide 113, and can keep the light guide 113 in position.

Figure 7:
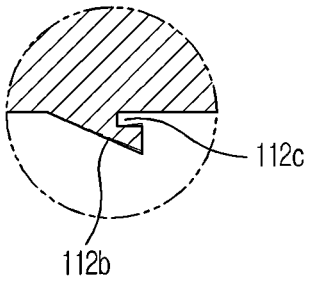
FIG. 7 is a sectional view of the portion "A" of FIG. 6.

During the coupling of the light source holder 112 to the guide holder 114, the fixing rib 112b and the light guide 113 move relatively each other while being in contact, possibly causing the light guide 113 to be scratched. Thus, in one embodiment, the fixing rib 112b may be tapered as shown in FIG. 7. The tapered fixing rib 112b may reduce possible damages to the light guide 113 during the installation of the light source holder 112 in the guide holder 114.

To address the possible thermal expansion of the light guide 113, according to an embodiment shown in FIG. 7, the fixing rib 112b may be provided with a neck portion 112c, which forms a recessed portion between the fixing portion 112a and the fixing rib 112b.

If a greater pressure is applied to an outer surface of the fixing rib 112b as the light guide 113 is thermally deformed, the neck portion 112c allows elastic movement of the fixing rib 112b. As a result, the light guide 113 can be stably supported at a fixed position without damaging the fixing rib 112b. The structure of the neck portion 112c is described only by way of an example for addressing thermal deformation of the light guide 113, and does not limited the present embodiments to the particular structure. Various other shapes or structures can also be employed to account for the thermal expansion of the light guide 113. For example, when the light source holder 112, the fixing portion 112a and/or the fixing rib 112b itself is made of an elastically deformable flexible material, the light source holder 112 can also stably support the light guide 113.

In addition, the illuminator 110 may further include positioning guides 112d and 114d to set the mounting position of the light source holder 112 relative to the guide holder 114. The positioning guides, 112d and 114d are shaped to match each other, and are arranged to be opposing positions on the guide holder 114 and the light source holder 112, respectively. When coupling the light source holder 112 to the guide holder 114, the coupling position can be set on the basis of the positioning guides 112d and 114d, making rapid and accurate coupling between the guide holder 114 and the light source holder 112 possible.

Preferably, the light source holder 112 may be capable of being snap-fitted to the mounting portion 114b of the guide holder 114. Snap-fitting may not require any screws or bonding adhesives and, therefore, advantageously enables easy coupling.

The light source holder 112, as shown in FIG. 3, can be coupled to the mounting portion 114b in a direction substantially parallel the longitudinal direction of the light guide 113. To that end, to mount the light source holder 112 in the mounting portion 114b, hook members 112e and holding protrusions 114e may be provided.

The hook members 112e, as shown in FIGS. 6 and 8, may extend from a surface of the light source holder 112 facing the guide holder 114, and the holding protrusions 114e may be provided at positions of the guide holder 114 corresponding to the mounted positions of the respective hook members 112e. When the hook members 112e engage the holding protrusions 114e, the light source holder 112 may be coupled to the guide holder 114.

While in the above embodiment, the light guide holder 112 is described to have formed therewith the hook members 112e, and the guide holder 114 as including the holding protrusions 114e, but the present invention is not so limited. For example, the respective locations of the hook members and holding protrusions may be reversed.

Figure 10:
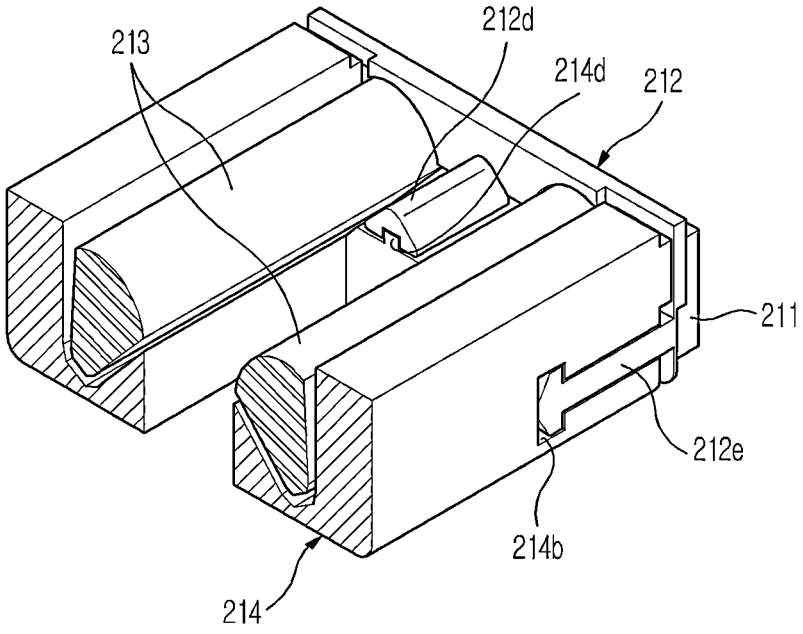
FIG. 10 is a perspective and a partial sectional view of an illuminator in accordance with a second embodiment of the present invention.

In addition, the hook members 112e are not limited to the above-described configuration. For example, according to a second embodiment of illuminator shown in FIG. 10, each hook member 212e of the light source holder 212 may be formed, at the distal tip end thereof, with a relatively large width portion while the light source mounting portion 214b of a guide holder 214 may be provided with a recess having a shape corresponding to that of the hook member 212e. Accordingly, the light source holder 212 can be coupled to the guide holder 214 as the hook member 212e is snap-fitted in the mounting portion 214b as shown in FIG. 10.

Figure 11:
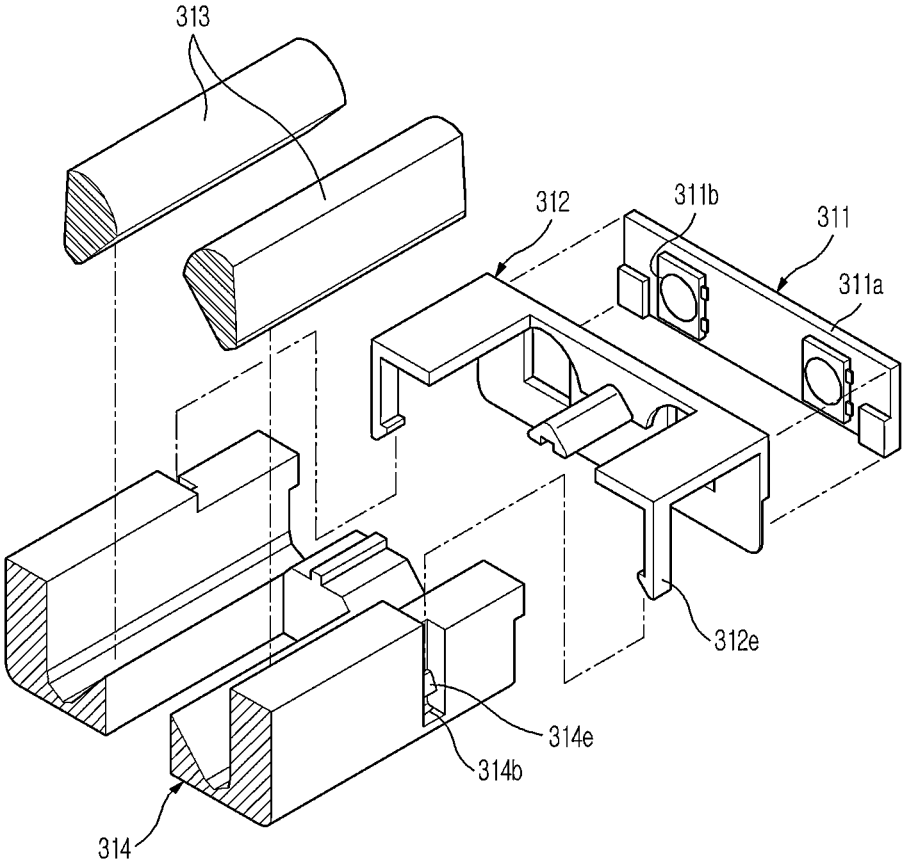
FIG. 11 is an exploded and a partial sectional view of relevant portions of an illuminator in accordance with a third embodiment of the present invention.

Referring to FIG. 11 illustrating an illuminator according to a third embodiment, a light source holder 312 may be fitted into a mounting portion 314b of a guide holder 314 in a direction orthogonal to the longitudinal direction of a light guide 313. For example, an illuminator of this embodiment may further include hook members 312e and holding protrusions 314e, to stably fit the light source holder 312 into the mounting portion 314b.

The hook members 312e, as shown in FIG. 11, may protrude downward from side edges of the light source holder 312, and the holding protrusions 314e may be provided at positions of the guide holder 314 corresponding to the mounted position of the respective hook members 312e. Accordingly, as the hook members 312e engage the holding protrusions 314e, the light source holder 312 can be coupled to the guide holder 314.

When the light source holder 312 is coupled to the guide holder 314 in the above-described direction, as there is substantially no risk of the contact position between the fixing rib of the light source holder 312 and the light guide 313 being changed during assembly, the generation of scratches can thus be substantially avoided.

The above-described configuration of the illuminator, along with one or more features of previously described embodiments, advantageous allows precise positioning an/or quick coupling of the light guide 313 and the light source 311. In addition, the light guide 313 can be firmly supported to maintain straightness thereof.

Figure 12:
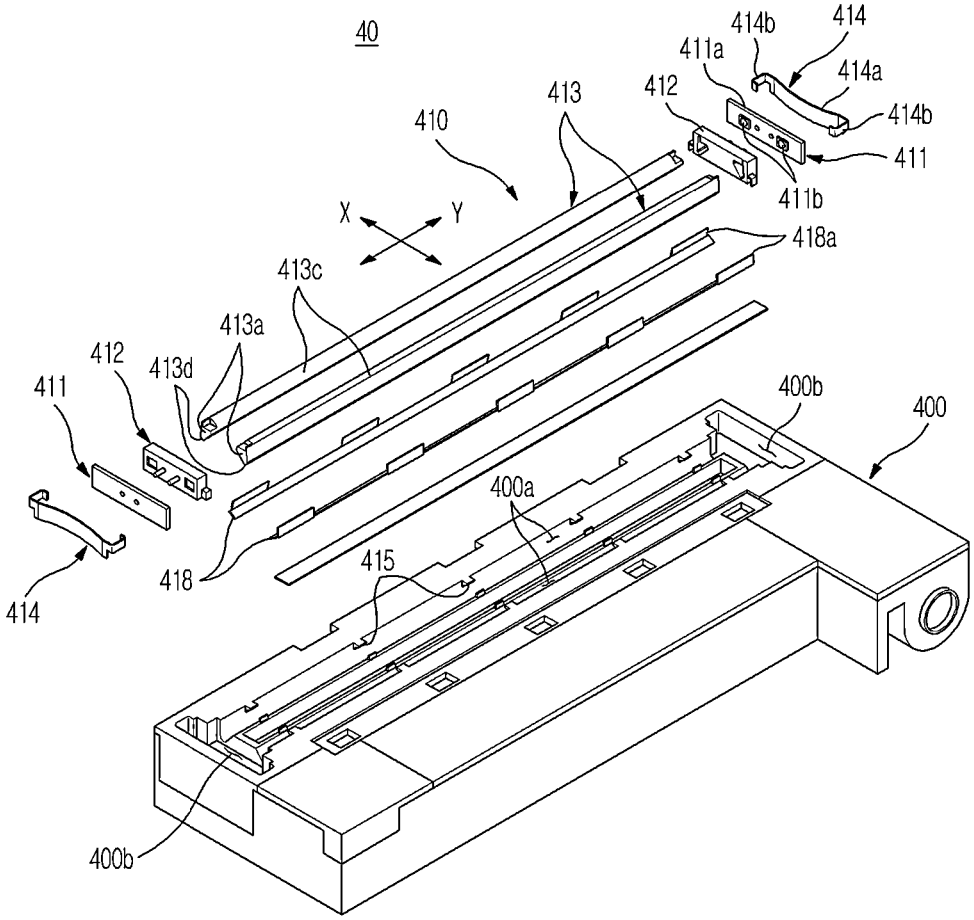
FIG. 12 is an exploded perspective view illustrating a scanner module including an illuminator in accordance with a fourth embodiment of the present invention.

Although the illuminator 110 in accordance with the first embodiment of the present invention includes the guide holder 114 to be mounted into the scanner module body 100 after the light guides 113, light sources 111 and light holders 112 are mounted to the guide holder 114, the present invention is not so limited. For example, referring to FIG. 12 illustrating an illuminator according to a fourth embodiment, instead of using the guide holder 114, an illuminator 410 of a scanner module 40 includes light guides 413, light sources 411 and light source holders 412, and a scanner module body 400, on which the light guide mounting portions 400a for mounting of the light guides 413 and the light source mounting portions 400b for mounting of both the light sources 411 and the light source holders 412 are provided. With this configuration, the light guides 413, light sources 411 and light source holders 412 can be directly mounted into the scanner module body 400.

The light guide mounting portions 400a extend along the main scanning direction Y, i.e. in the longitudinal direction of the light guides 413. The light source mounting portions 400b are formed, at both ends of the light guide mounting portions 400a, to have a larger width than the width of the light guide mounting portions 400a. In the present embodiment, a pair of the light guides 413 are mounted in the scanner module body 400 such that they are parallel to each other in the sub scanning direction X, and for mounting of the pair of light guides 413, a pair of the light guide mounting portions 400a are provided parallel to each other in the sub scanning direction X.

In this embodiment, a light guide 413 is mounted in the light guide mounting portion 400a in such a manner that at least one of the longitudinal ends thereof is elastically supported by an elastic member 414. This serves to minimize deformation of the light guide 413 caused when the light guide 413 increases in length due to thermal expansion by heat generated from the light sources 411. If the light guide 413 increases in length due to thermal expansion, the light guide 413 may become convexly deformed, or bowed, at the center of an emission face 413c, causing variation in characteristics of light emitted through the light guide 413 and deterioration in image scanning performance.

Figure 13:
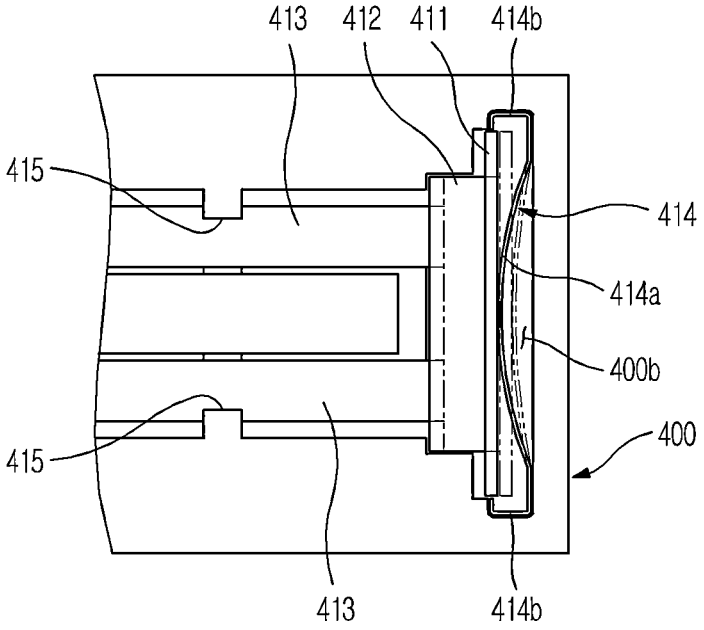
FIG. 13 is a plan view illustrating coupling of a light source and light source holder provided in the scanner module shown in FIG. 12.

By elastically supporting at least one of end of the light guide 413 using the elastic member 414, even if the light guide 413 increases in length due to thermal expansion, the elastic member 414 can partially compensate for the increase in the length of the light guide 413 via elastic deformation thereof as shown in FIG. 13. This substantially reduces the emission face 413c of the light guide 413 from being bent or bowed.

Figure 14:
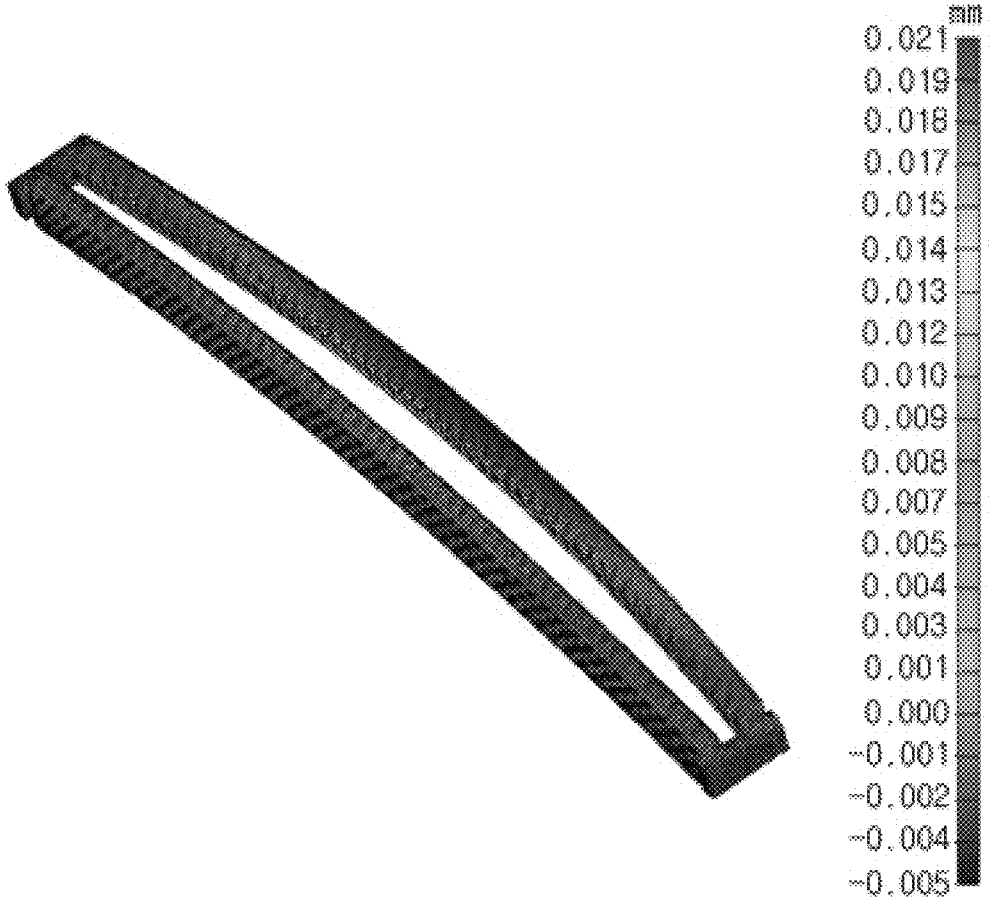
FIG. 14 is a view illustrating numerical analysis results of deformation of a light guide in response to thermal expansion of the light guide when no elastic member is provided.
Figure 15:
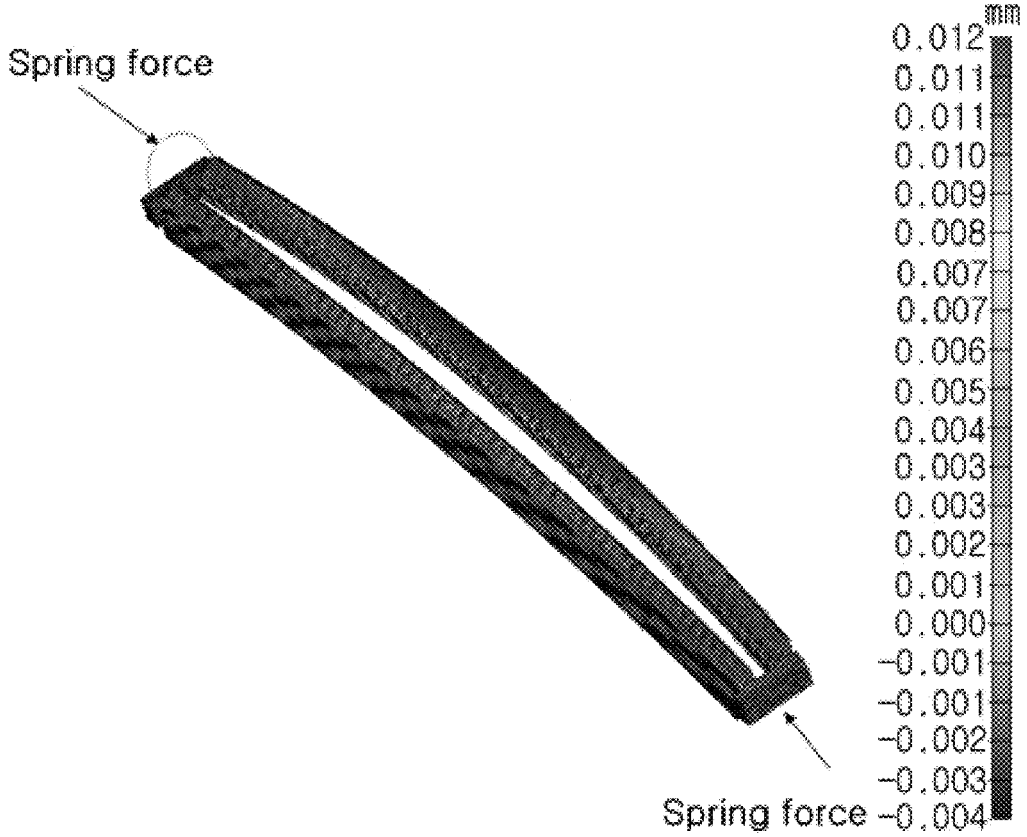
FIG. 15 is a view illustrating numerical analysis results of deformation of a light guide in response to thermal expansion of the light guide when elastic members are provided.

FIG. 14 is a view illustrating results of numerical analysis of deformation of the light guide 413 when both the ends of the light guide 413 are fixedly supported, and FIG. 15 is a view illustrating results of numerical analysis of deformation of the light guide 413 when both ends of the light guide 413 are elastically supported by the elastic members 414.

As can be seen from FIGS. 14 and 15, the light guide 413 has a deformation amount of about 0.021 mm when both the ends of the light guide 413 are fixedly supported, whereas the light guide 413 has a deformation amount of 0.012 mm when both the ends of the light guide 413 are elastically supported by the elastic members 414. Accordingly, in this example, it can be appreciated that supporting both the ends of the light guide 413 via the elastic members 414 may reduce the deformation amount of the light guide 413 to about half.

When the length of the light guide 413 varies according to heat generated from the light sources 411, an incidence face 413a of the light guide 413 may become spaced further apart from a corresponding light emitting diode 411b of the light source 411. In this case, light loss may occur as the light irradiated from the light emitting diode 411b passes through air between the light emitting diode 411b and the incidence face 413a. Therefore, to minimize the light loss, it is preferred that the incidence face 413a provided at either end of the light guide 413 come into close contact with the corresponding light emitting diode 411b of the light source 411.

In an embodiment, to maintain the proper distance between the incidence surface 413a and the light emitting diode 411b, the light source 411 is mounted to either end of the light guide 413 via the light source holder 412, and the elastic member 414 is provided between the light source 411 and a wall surface of the light source mounting portion 400b to elastically support the light guide 413 indirectly by way of the light source 411. When supporting the light guide 413 in this manner using the elastic member 414 with the light source 411 being interposed between the incidence surface 413a and the elastic member 414, the elastic member 414 can reduce the possible bowing of the light guide 413, and may also allow the light emitting diode 411b of the light source 411 to maintain a sufficiently close proximity to the corresponding incidence face 413a of the light guide 413, resulting in reduction of light loss.

In the present embodiment, although the light emitting diodes 411b are mounted to the light source holder 412 in a state of being mounted on a substrate 411a, the present invention is not limited thereto. For example, after the light emitting diodes 411b are directly mounted to the light source holder 412 without a structure corresponding to the substrate 411a, the light source holder 412 is elastically supported by the elastic member 414, whereby the light emitting diodes 411b can come into close contact with the incidence face 413a of the light guide 413.

Referring again to FIG. 12, the elastic member 414 according to an embodiment may be a leaf spring. The elastic member 414 in the form of a leaf spring consists of a center elastic portion 414a, which is convexly raised to exhibit an elastic force so as to elastically support the light source holder 112, and supporting portions 414b which are defined at both sides of the elastic portion 414a to allow the elastic member 414 to be supported in the light source mounting portion 400b. The elastic member 414 may be made of a material exhibiting high thermal conductivity, such as metallic material, to thus serve, in addition to providing the elastic support, as a radiating member to radiate heat generated from the light source 411 away from the light source 411.

Figure 16:
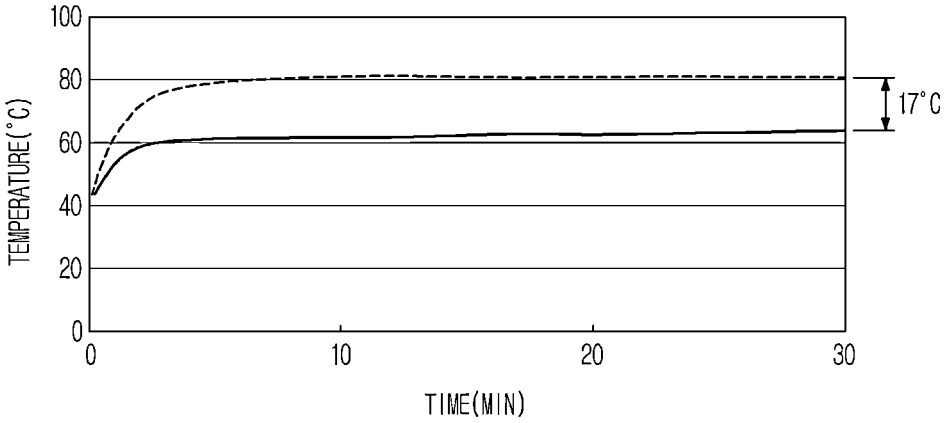
FIG. 16 is a graph comparing temperatures of a light source in both cases where the light source is elastically supported by metal elastic members and where no elastic member is provided.

FIG. 16 is a graph showing the measured temperatures of the light source 411 in both cases of when the metal elastic members 414 is used and when it was not. In the graph of FIG. 16, the dotted curve represents the temperature variation when the elastic member 414 was not used, and the solid curve represents the temperature variation when the metal elastic member 414 is used. As can be seen from the graph, in this example, the use of the metal elastic member 414 can lower the temperature of the light source 411 by approximately 17.degree. C.

According to an embodiment, to more effectively restrict the emission face 413c of the light guide 413 from being deformed by heat generated from the light sources 411, supporting protrusions 415 protrude from an entrance of the light guide mounting portion 400a, so as to support a part of the emission face 413c of the light guide 413.

Figure 17:
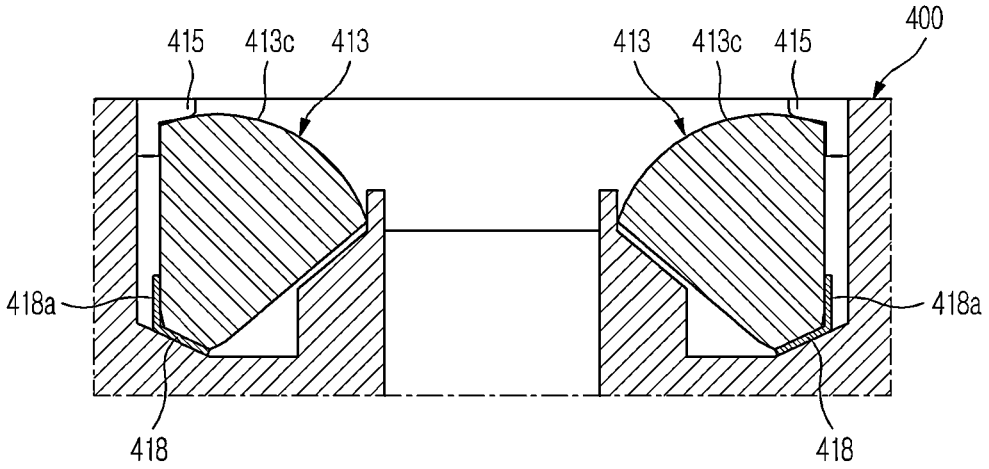
FIG. 17 is a sectional view illustrating an embodiment of the mounting of the light guide mounted in an illuminator.

Specifically, the supporting protrusions 415 are integrally formed with the scanner module body 400. The plurality of supporting protrusions 415 protrude in the sub scanning direction X and are spaced apart from one another in the main scanning direction Y. As shown in FIG. 17, when a part of the emission face 413c of the light guide 413 is supported by the supporting protrusions 415, the supporting protrusions 415 can restrict deformation of the light guide 413 even if the light guide 413 thermally expands due to heat generated from the light sources 411. In the present embodiment, the pair of light guide mounting portions 400a are arranged parallel to each other in the sub scanning direction X, and each supporting protrusion 415 protrudes in the sub scanning direction X from one side of the light guide mounting portion 400a so as to support a part of the emission face 413c of the light guide 413.

Figure 18:
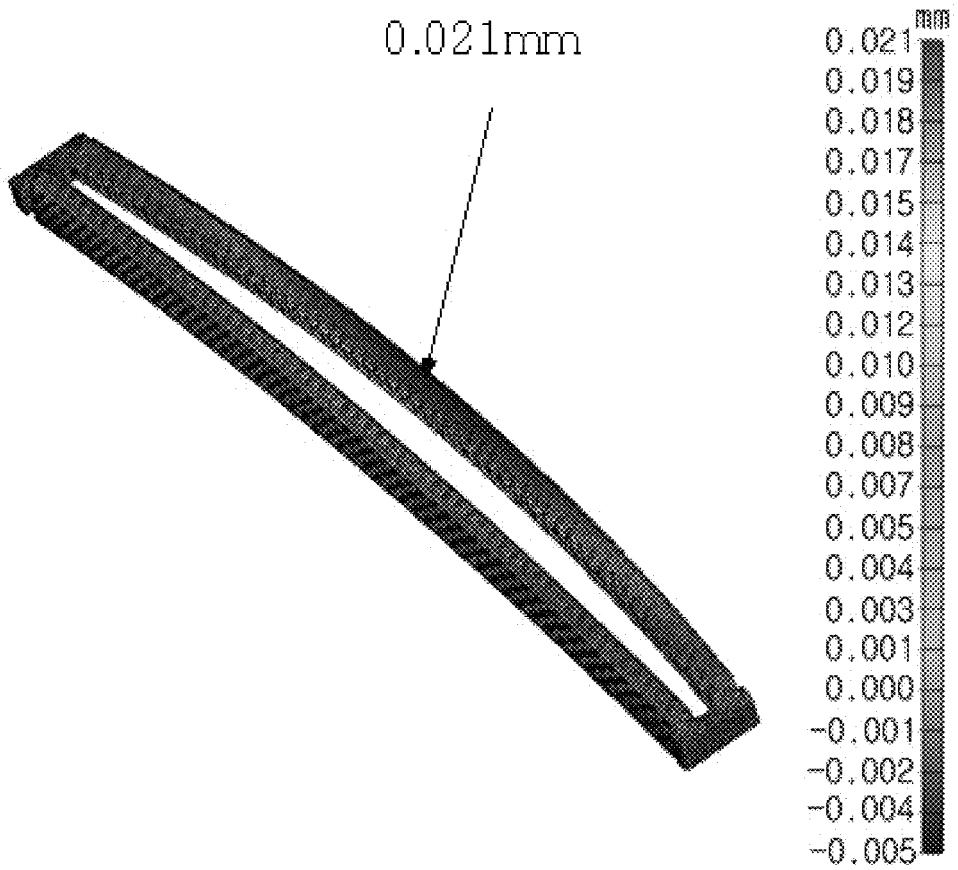
FIG. 18 is a view illustrating numerical analysis results of deformation of a light guide in response to thermal expansion of the light guide when no supporting protrusion is provided.
Figure 19:
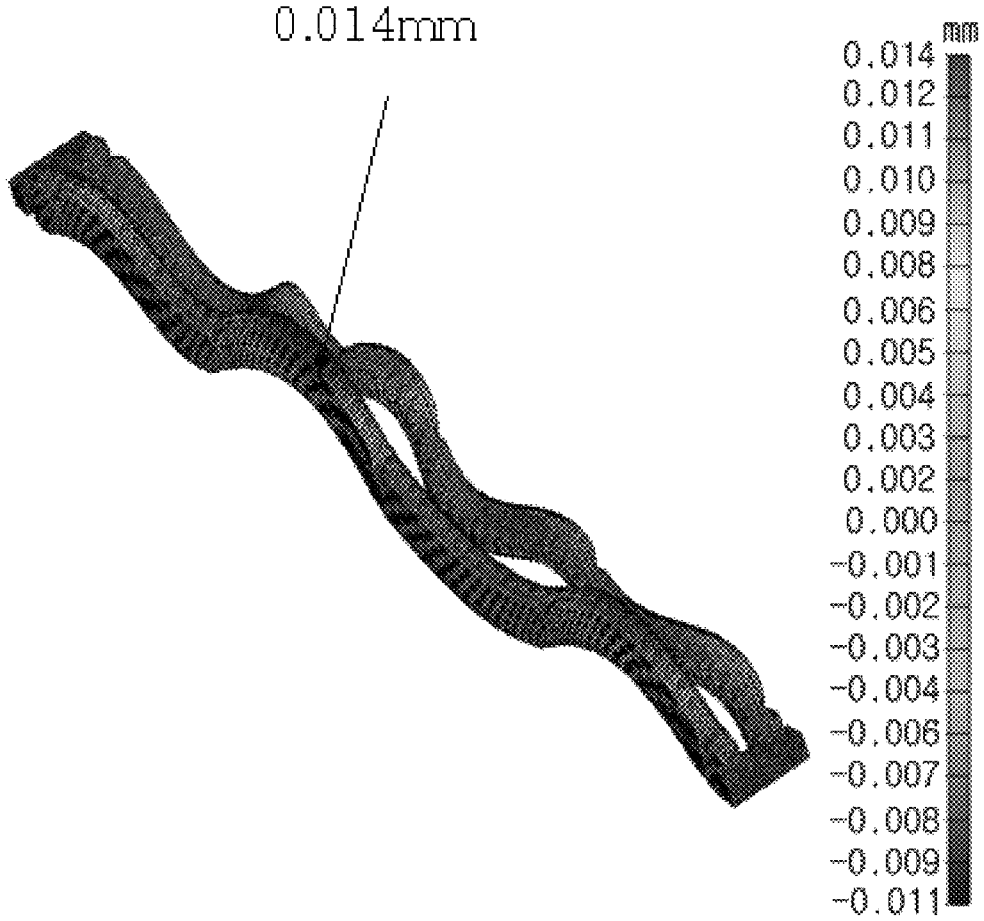
FIG. 19 is a view illustrating numerical analysis results of deformation of a light guide in response to thermal expansion of the light guide when supporting protrusions are provided.

FIG. 18 is a view illustrating numerical analysis results of deformation of the light guide 413 when not using the supporting protrusion 415, and FIG. 19 is a view illustrating numerical analysis results of deformation of the light guide 413 when using three supporting protrusions 415.

As can be seen from FIGS. 18 and 19, in this example, the light guide 413 has a deformation amount of about 0.021 mm when the supporting protrusion 415 was not used, whereas the light guide 413 has a deformation amount of about 0.014 mm when the emission face 413c of the light guide 413 is supported by the supporting protrusions 415. Accordingly, it can be appreciated that use of the supporting protrusions 415 can substantially reduce the deformation amount of the light guide 413.

As described above, when the light guide 413 is elastically supported by the elastic members 414 and/or when the emission face 413c of the light guide 413 is supported by the supporting protrusions 415, deformation of the light guide 413 can be reduced. Accordingly, to minimize deformation of the light guide 413, as described with relation to the present embodiment, it is preferred that both the ends of the light guide 413 be elastically supported by the elastic members 414 and that the emission face 413c of the light guide 413 be supported by the plurality of supporting protrusions 415.

The supporting protrusions 415 provided at the entrance of the light guide mounting portion 400a as described above, further, have the effect of preventing the light guide 413 from being separated from the light guide mounting portion 400a even when subjected to vibration or shock during, e.g., transportation of the scanner module 40 or of a variety of appliances in which the scanner module 40 is included.

As a result of performing a drop test from a height of 30 cm, simulating a drop that may be experienced by the scanner module 40 during transport, under several conditions of different numbers of supporting protrusions 415, the light guide 413 was separated from the light guide mounting portion 400a when two supporting protrusions 415 were provided, but remained in the light guide mounting portion 400a when three supporting protrusions 415 were provided. Accordingly, it is preferable that three or more supporting protrusions 415 be formed to protect against external vibration or shock, in order to prevent the light guide 413 from being separated from the light guide mounting portion 400a of the scanner module body 400.

Referring again to FIG. 12, a reflecting face 413d provided at the light guide 413 has a convex and concave pattern. With this configuration, a part of the light, irradiated from the light emitting diodes 411b and introduced into the light guide 413, may leak from the reflecting face 413d of the light guide 413 to the outside, causing light loss. Therefore, a reflecting plate 418 is disposed at the rear side of the reflecting face 413d of the light guide 413, to reflect the light, leaked from the reflecting face 413d to the outside of the light guide 413, toward the reflecting face 413d, so as to allow the reflected light to be again introduced into the light guide 413 through the reflecting face 413d. In the present embodiment, a pair of light guides 413 are provided and therefore, a pair of reflecting plates 418 are provided such that the reflecting plates 418 are provided at the rear side of the reflecting faces 413d of the pair of light guides 413, respectively. A supporting piece 418a is formed at one side of each reflecting plate 418, to be supported on one side of the light guide 413. Through the supporting piece 418a, the reflecting plate 418 can be stably mounted in the corresponding light guide mounting portion 400a.

While an embodiment is described above to include an elastic member 414, in the form of a metal leaf spring, to elastically supports the light guide 413 and the light source 411, the present invention is not so limited. For example, an elastic member 514, made of an elastic resin material such as rubber, may alternatively be used as shown in FIG. 20.

Figure 20:
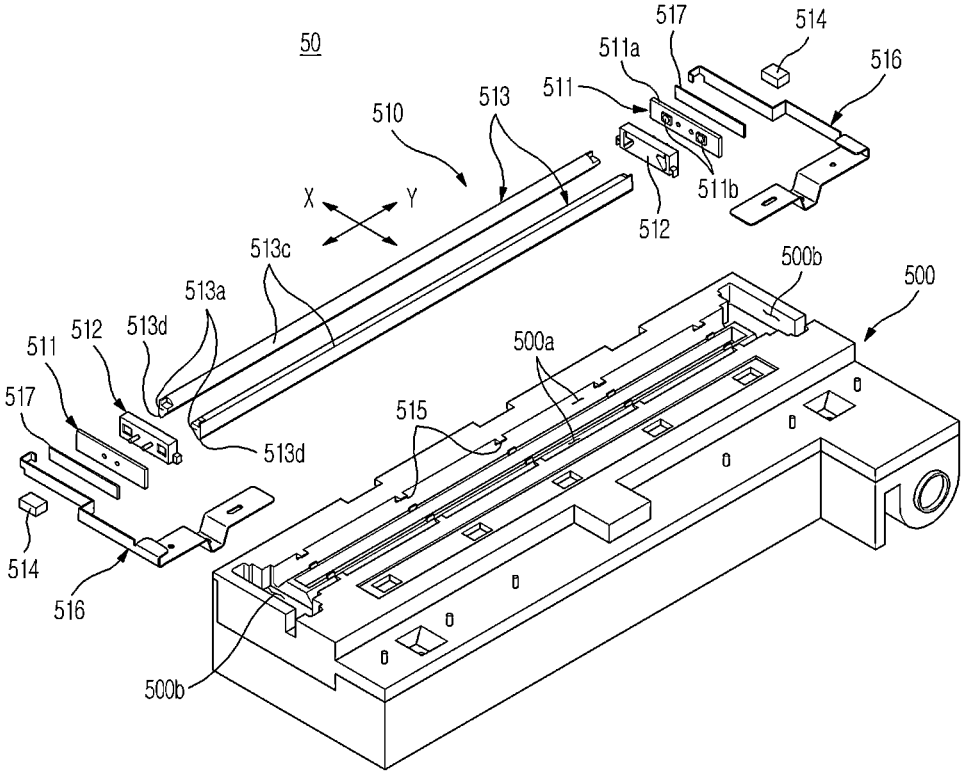
FIG. 20 is an exploded perspective view illustrating a scanner module including an illuminator in accordance with a fifth embodiment of the present invention.

Referring to FIG. 20, the elastic resin member 514 may exhibit poor thermal conductivity, and may not be as effective in removing the heat generated by the light source 511. In an embodiment, a radiating member 516, made of material that has a sufficiently high thermal conductivity, may be provided between the elastic member 514 and the light source 511.

One end of the radiating member 516 may be located between the elastic member 514 and the light source 511 while the other end of the radiating member 516 extends out of a light source mounting portion 500b, and is mounted to a portion of the scanner module body 500. The heat generated from the light source 511 is transferred along the radiating member 516, and is radiated via heat exchange with air outside the light source mounting portion 500b. As a result, heat generated from the light source 511 can be radiated.

In the above-described configuration, thermal conductivity between the light source 511 and the radiating member 516 is proportional to the contact area between the light source 511 and the radiating member 516. When facing surfaces of the light source 511 and the radiating member 516 are not flat and thus, have a relatively small contact area between them, a thermal coupling 517 may be provided between the light source 511 and the radiating member 516 to enhance the transfer of heat generated from the light source 511 to the radiating member 516. The thermal coupling 517 may be made of a material exhibiting high thermal conductivity, and may be configured to closely contact both facing surfaces of the light source 511 and the radiating member 516. The thermal coupling 517 can indirectly maximize the contact area between the light source 511 and the radiating member 516, and, consequently, can allow heat generated from the light source 511 to be effectively transmitted to and radiated by the radiating member 516.

In the present embodiment, although the thermal coupling 517 is provided between the light source 511 and the radiating member 516, when the light emitting diodes 511b are directly mounted to the light source holder 512 without a structure corresponding to the substrate 511a, the thermal coupling 517 may be provided between the light source holder 512 and the radiating member 516.

Figure 9:
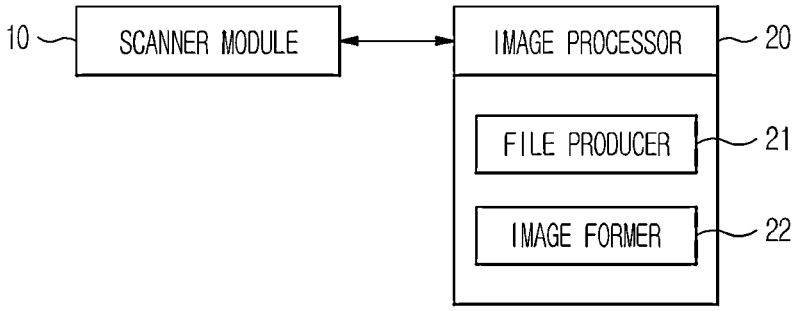
FIG. 9 is a block diagram illustrating an image scanning apparatus employing a scanner module in accordance with an embodiment of the present invention.

FIG. 9 is a block diagram illustrating an image scanning apparatus employing a scanning module, various embodiments of which have been described above. Referring to the drawing, the image scanning apparatus may include the scanner module 10, and an image processor 20 to process an image obtained from the scanner module 10. Here, the image scanning apparatus in accordance with the present invention may include, e.g., a Multi-Functional Printer (MFP), a digital copier, a scanner, a facsimile, or the like.

The scanner module 10 is substantially identical to the embodiments variously described above, a detailed description of which need not be repeated. The image processor 20 may include at least one of a file producer 21 to produce an image file from an image obtained from the sensor unit 130 (FIG. 1) and an image former 22 to form an image on a printing medium on the basis of the obtained image.

The file producer 21 may be, e.g., a controller that may also control operations of various components of the image scanning apparatus, including, e.g., the scanner module. To this end, according to an embodiment, the controller may be, e.g., a microprocessor, a microcontroller or the like, that includes a CPU to execute one or more computer instructions to implement the various control operations of the scanning apparatus, and may further include a memory device, e.g., a Random Access Memory (RAM), Read-Only-Memory (ROM), a flesh memory, or the like, to store the one or more computer instructions. The method in which the controller controls various components of an image scanning apparatus is similar to that of well-known image scanning apparatuses, detailed description thereof is thus unnecessary.

The image former 22 may include one or more of components of an image forming apparatus, for example, of an electro-photographic printing apparatus, that includes, e.g., a printing medium feeding unit that holds, picks up and feeds printing medium, an exposure unit for drawing a latent image using light on a photosensitive surface, a developing unit to develop the latent image with toner, a transfer unit to transfer the toner image onto the printing medium, a fixing unit to fuse the toner image sufficiently permanently on the printing medium and a discharging unit for discharging a printing medium on which an image has been fixed. As known to those skilled in the art, there are many available and known other various image forming mechanisms.

While the above embodiments are generally described in references to examples of a charge coupled device module (CCDM) type scanner module, in which a light source and a plurality of reflecting mirrors constitute a single module, the present invention is also applicable to other types of scanning module, including, e.g., a Mirror Moving Type (MMT), in which a light source and a single reflecting mirror constitute one module and two reflecting mirrors constitute another module.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A scanner module for use in an image scanning apparatus to scan an object, comprising:

a light source configured to produce light emitted by the scanner module to scan the object; and a heat radiating member made of an elastically deformable material to cause the light source to come into close contact with the heat radiating member and configured to dissipate heat generated from the light source when the light source produces the light.

2. The scanner module according to claim 1, wherein the radiating member comprises a metallic leaf spring.

3. The scanner module according to claim 1, wherein the heat radiating member is made of a thermally conductive material.

4. The scanner module according to claim 1, wherein the light source comprises a light emitting diode.

5. An image scanning apparatus, comprising:

a scanner module, wherein the scanner module comprises:

an illuminator configured to illuminate light on an object to be scanned; and a sensor configured to detect the light reflected from the object, wherein the illuminator comprises:

a light source configured to produce the light illuminated on the object to scan the object; and a heat radiating member to dissipate heat generated from the light source when the light source produces the light, the heat radiating member being made of an elastically deformable material.

6. The image scanning apparatus according to claim 5, wherein the heat radiating member is made of a thermally conductive material.

7. The image scanning apparatus according to claim 5, wherein the light source comprises a light emitting diode.

8. A scanner module for use in an image scanning apparatus to scan an object, comprising:

a light source configured to produce light;

a heat radiating member configured to dissipate heat generated from the light source; and a light guide having an elongated shape with its length extending along a first direction, the light guide being configured to receive the light from the light source, and to change a direction of the received light, wherein the heat radiating member is in contact with the light source.

9. The scanner module according to claim 8, wherein the light source is mounted on the longitudinal end of the light guide.

10. The scanner module according to claim 9, wherein the light source comprises a pair of light sources, and wherein the heat radiating member comprises a pair of heat radiating members to come contact with the pair of light sources respectively.

11. The scanner module according to claim 8, wherein the heat radiating member includes a first portion in contact with the light source to dissipate heat generated from the light source and a second portion extending from the first portion without making contact with the light source.

12. An image scanning apparatus, comprising:

a scanner module, wherein the scanner module comprises:

an illuminator configured to illuminate light on an object to be scanned; and a sensor configured to detect the light reflected from the object, wherein the illuminator comprises:

a light source configured to produce the light;

a light guide having an elongated shape with its length extending along a first direction, the light guide being configured to receive the light from the light source, and to change a direction of the received light; and a heat radiating member to dissipate heat generated from the light source, and wherein the heat radiating member is in contact with *the* light source.

13. The image scanning apparatus according to claim 12, wherein the heat radiating member is a made of an elastically deformable material to cause the light source to come into close contact with the heat radiating member.

14. The image scanning apparatus according to claim 13, wherein the radiating member comprises a metallic leaf spring.

15. The image scanning apparatus according to claim 12, wherein the light source holder is mounted on the longitudinal end of the light guide.

16. The image scanning apparatus according to claim 15, wherein the light source comprises a pair of light sources, and wherein the heat radiating member comprises a pair of heat radiating members to come in contact with the pair of light sources respectively.

17. The image scanning apparatus according to claim 12, wherein the heat radiating member includes a first portion in contact with the light source to dissipate heat generated from the light source and a second portion extending from the first portion without making contact with the light source.

*18. An image forming apparatus comprising:*

*a document bed; and*

*a scanning module operable to scan a document placed on the document bed, the scanning module including an illuminator to illuminate light onto the document to be scanned, and a sensor to detect the light reflected by the document, the illuminator including:*

*a first light source;*

*first light guide to receive light produced from the first light source;*

*a second light source;*

*a second light guide to receive light from the second light source, each of the first light guide and the second light guide having an elongated shape with an incidence face formed on one of longitudinal ends thereof to receive light, each of the first light guide and the second light guide to change a direction of the light received through the incidence face;*

*a heat radiating member made of an elastically deformable material to cause the first light source to come into close contact with the heat radiating member and to dissipate heat generated from the first light source when the first light source produces the light; and*

*a first light source holder having a reflective material at least on a side surface thereof facing the incidence face of the first light guide, the first light source being mounted to the first light source holder,*

*wherein the first light guide and the second light guide includes:*

*a first guide face,*

*a second guide face,*

*an emission face provided between the first guide face and the second guide face to emit light from the respective light guide to the document to be scanned, and*

*a reflecting face located opposite to the emission face to reflect light received through the incidence face,*

*wherein each of the first guide face and the second guide face extends between the longitudinal ends of the first light guide and the second light guide, respectively, such that a first plane corresponding to the first guide face forms an acute angle with a second plane corresponding to the second guide face.*

*19. The image forming apparatus of claim 18, wherein the reflective material of the first light source holder has a light reflectivity of 70% or greater.*

*20. The image forming apparatus of claim 18, wherein the reflective material of the first light source holder is made out of a white material.*

*21. The image forming apparatus of claim 18, wherein the first light source and the second light source include a light emitting diode, respectively.*

*22. The image forming apparatus of claim 18, further comprising a second light source holder having a reflective material at least on a side surface thereof facing the incidence face of the second light guide, the second light source being mounted to the second light source holder.*

*23. The image forming apparatus of claim 22, wherein the reflective material of the second light source holder has a light reflectivity of 70% or greater.*

*24. The image forming apparatus of claim 22, wherein the reflective material of the second light source holder is made out of a white material.*

*25. A scanner module for an image forming apparatus to scan an object, comprising:*

*a first light source;*

*a first light guide to receive light produced from the first light source;*

*a second light source;*

*a second light guide to receive light produced from the second light source, each of the first light guide and the second light guide having an elongated shape with an incidence face formed on one of longitudinal ends thereof to receive light, each of the first light guide and the second light guide to change a direction of the light received through the incidence face; and*

*a heat radiating member made of an elastically deformable material to cause the first light source to come into close contact with the heat radiating member and to dissipate heat generated from the first light source when the first light source produces the light; and*

*a first light source holder having a reflective material at least on a side surface thereof facing the incidence face of the first light guide, the first light source being mounted to the first light source holder,*

*wherein the first light guide and the second light guide includes:*

*a first guide face,*

*a second guide face,*

*an emission face provided between the first guide face and the second guide face to emit light from the respective light guide to the object to be scanned, and*

*a reflecting face located opposite to the emission face to reflect light received through the incidence face,*

*wherein each of the first guide face and the second guide face extends between the longitudinal ends of the first light guide and the second light guide, respectively, such that a first plane corresponding to the first guide face forms an acute angle with a second plane corresponding to the second guide face.*

*26. The scanner module of claim 25, wherein the reflective material of the first light source holder has a light reflectivity of 70% or greater.*

*27. The scanner module of claim 25, wherein the reflective material of the first light source holder is made out of a white material.*

*28. The scanner module of claim 25, wherein the first light source and the second light source include a light emitting diode, respectively.*

*29. The scanner module of claim 25, further comprising a second light source holder having a reflective material at least on a side surface thereof facing the incidence face of the second light guide, the second light source being mounted to the second light source holder.*

*30. The scanner module of claim 29, wherein the reflective material of the second light source holder has a light reflectivity of 70% or greater.*

*31. The scanner module of claim 29, wherein the reflective material of the second light source holder is made out of a white material.*

* * * * *